US012358285B2

(12) United States Patent
Mori et al.

(10) Patent No.: US 12,358,285 B2
(45) Date of Patent: Jul. 15, 2025

(54) LIQUID DISCHARGE HEAD AND LIQUID DISCHARGE DEVICE

(71) Applicant: SEIKO EPSON CORPORATION, Tokyo (JP)

(72) Inventors: Masaki Mori, Shiojiri (JP); Motoki Takabe, Shiojiri (JP); Eiju Hirai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 185 days.

(21) Appl. No.: 18/166,187

(22) Filed: Feb. 8, 2023

(65) Prior Publication Data

US 2023/0249462 A1 Aug. 10, 2023

(30) Foreign Application Priority Data

Feb. 9, 2022 (JP) ................................ 2022-018426

(51) Int. Cl.
*B41J 2/14* (2006.01)

(52) U.S. Cl.
CPC ....... *B41J 2/14274* (2013.01); *B41J 2/14233* (2013.01); *B41J 2002/14258* (2013.01); *B41J 2002/14491* (2013.01)

(58) Field of Classification Search
CPC ................ B41J 2/14274; B41J 2/14233; B41J 2002/14258; B41J 2002/14491; B41J 2002/14362; B41J 2002/14241; B41J 2002/14419; B41J 2/14201
See application file for complete search history.

(56) References Cited

U.S. PATENT DOCUMENTS

2005/0190232 A1* 9/2005 Lee .......................... B41J 2/161 347/45

FOREIGN PATENT DOCUMENTS

JP 2011-104916 A 6/2011

* cited by examiner

*Primary Examiner* — Lisa Solomon
(74) *Attorney, Agent, or Firm* — WORKMAN NYDEGGER

(57) ABSTRACT

A piezoelectric body that is driven to apply pressure to a liquid in the plurality of pressure chambers, and contains lead atoms, a first electrode that is provided on a first surface of two surfaces of the piezoelectric body, a second electrode that is provided on a second surface opposite to the first surface of the two surfaces of the piezoelectric body, a drive wiring that is electrically coupled to the first electrode and the second electrode, and applies a voltage for driving the piezoelectric body, a resistor that is formed of the same material as any of the first electrode, the second electrode, and the drive wiring to measure a temperature of the liquid in the plurality of pressure chambers, and a diffusion suppression layer that is provided between the resistor and the piezoelectric body to suppress diffusion of lead atoms contained in the piezoelectric body into the resistor.

17 Claims, 13 Drawing Sheets

LIQUID DISCHARGE HEAD AND LIQUID DISCHARGE DEVICE

The present application is based on, and claims priority from JP Application Serial Number 2022-018426, filed Feb. 9, 2022, the disclosure of which is hereby incorporated by reference herein in its entirety.

BACKGROUND

1. Technical Field

The present disclosure relates to a liquid discharge head and a liquid discharge device.

2. Related Art

A liquid discharge head of a liquid discharge device such as a piezo ink jet printer has a pressure chamber filled with a liquid and a piezoelectric body for applying pressure to the liquid in the pressure chamber. For example, JP-A-2011-104916 discloses a liquid discharge device having a liquid discharge head, and a resistor for measuring the temperature of a liquid in the liquid discharge device.

However, in the technology according to the related art, when the piezoelectric body and the resistor for measuring the temperature are used together, there is a problem in that the accuracy of temperature measurement by the resistor may decrease.

SUMMARY

In order to solve the above problems, a liquid discharge head according to the present disclosure includes a pressure chamber substrate that is provided with a plurality of pressure chambers, a piezoelectric body that is driven to apply pressure to a liquid in the plurality of pressure chambers, and contains lead atoms, a first electrode that is provided on a first surface of two surfaces of the piezoelectric body, a second electrode that is provided on a second surface opposite to the first surface of the two surfaces of the piezoelectric body, a drive wiring that is electrically coupled to the first electrode and the second electrode, and applies a voltage for driving the piezoelectric body, a resistor that is formed of the same material as any of the first electrode, the second electrode, and the drive wiring to measure a temperature of the liquid in the plurality of pressure chambers, and a diffusion suppression layer that is provided between the resistor and the piezoelectric body to suppress diffusion of lead atoms contained in the piezoelectric body into the resistor.

A liquid discharge device according to the present disclosure includes the above-described liquid discharge head, and a control section that controls a discharge operation from the liquid discharge head.

DESCRIPTION OF EXEMPLARY EMBODIMENTS

Hereinafter, embodiments for carrying out the present disclosure will be described with reference to the accompanying drawings. However, in each drawing, the dimension and scale of each section are appropriately different from the actual ones. In addition, since the embodiments described below are preferred specific examples of the present disclosure, various technically preferable limitations are attached, but the scope of the present disclosure is not limited to the embodiments unless otherwise stated to specifically limit the present disclosure in the following description.

1. First Embodiment

1.1. Outline of Liquid Discharge Device

Figure 1:
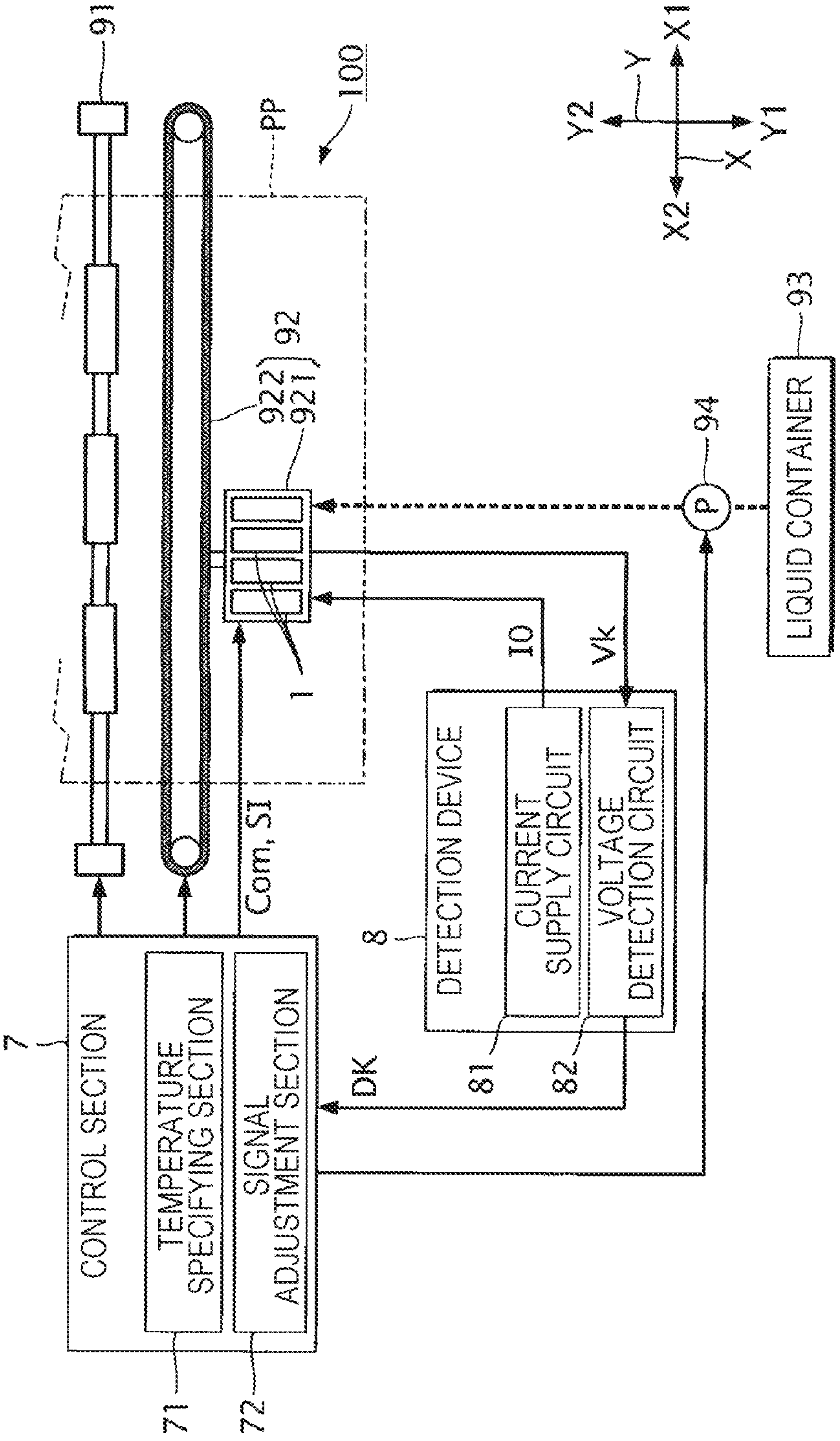
FIG. 1 is a schematic diagram illustrating a liquid discharge device according to a first embodiment.

FIG. 1 is a schematic diagram illustrating a liquid discharge device 100 according to a first embodiment. The liquid discharge device 100 is an ink jet printing device that discharges ink onto a medium PP. The medium PP is typically printing paper, but any print object, such as a resin film or fabric, can be used as the medium PP.

The liquid discharge device 100 includes a liquid container 93 that stores ink. As the liquid container 93, for example, a cartridge that can be attached to and detached from the liquid discharge device 100, a bag-shaped ink pack formed of a flexible film, or an ink tank that can be replenished with ink can be employed. A plurality of types of ink with different colors are stored in the liquid container 93.

The liquid discharge device 100 includes a plurality of liquid discharge heads 1, a control section 7, a detection device 8, a moving mechanism 91, a transport mechanism 92 and a circulation mechanism 94.

The control section 7 includes, for example, a processing circuit such as a CPU or FPGA, and a storage circuit such as a semiconductor memory, and controls each element of the liquid discharge device 100. Here, the CPU is an abbreviation for Central Processing Unit, and the FPGA is an abbreviation for Field Programmable Gate Array. Various programs and various data are stored in the storage circuit.

The moving mechanism 91 transports the medium PP in a Y1 direction along a Y axis under the control of the control section 7. Hereinafter, the Y1 direction and a Y2 direction opposite to the Y1 direction are collectively referred to as a Y axis direction. In addition, hereinafter, an X1 direction along an X axis that intersects the Y axis and an X2 direction opposite to the X1 direction are collectively referred to as an X axis direction. In addition, hereinafter, a Z1 direction along a Z axis that intersects the X axis and the Y axis and a Z2 direction opposite to the Z1 direction are collectively referred to as a Z axis direction. In the present embodiment, as an example, description will be performed while assuming that the X axis, the Y axis, and the Z axis are orthogonal to each other. However, the present disclosure is not limited to such an aspect. The X axis, the Y axis, and the Z axis may intersect each other.

The transport mechanism 92 reciprocates the plurality of liquid discharge heads 1 in the X1 direction and the X2 direction under the control of the control section 7. The transport mechanism 92 includes a storage case 921 that accommodates the plurality of liquid discharge heads 1, and an endless belt 922 to which the storage case 921 is fixed. The liquid container 93 may be stored in the storage case 921 together with the liquid discharge head 1.

The circulation mechanism 94 supplies the ink stored in the liquid container 93 to the liquid discharge head 1 under the control of the control section 7. In addition, the circulation mechanism 94 recovers the ink stored in the liquid discharge head 1 under the control of the control section 7 and refluxes the recovered ink to the liquid discharge head 1.

The control section 7 controls a discharge operation from the liquid discharge head 1. Specifically, the control section 7 supplies, with respect to the liquid discharge head 1, a drive signal Com for driving the liquid discharge head 1 and a control signal SI for controlling the liquid discharge head 1. The liquid discharge head 1 is driven by the drive signal Com under the control of the control signal SI to discharge the ink in the Z1 direction from some or all of a plurality of nozzles N provided in the liquid discharge head 1. That is, the liquid discharge head 1 causes the ink to be discharged from some or all of the plurality of nozzles N in conjunction with the transportation of the medium PP by the moving mechanism 91 and the reciprocation of the liquid discharge head 1 by the transport mechanism 92, and causes the discharged ink to land on the surface of the medium PP, thereby executing a printing process for forming a desired image on the surface of the medium PP. The nozzles N will be described later with reference to FIGS. 2 and 3.

The liquid discharge head 1 executes a maintenance process separately from the printing process. One of the maintenance processes is a flushing process. The flushing process is a process for forcibly removing thickened ink and air bubbles mixed in the ink by repeatedly driving the liquid discharge head 1 using the drive signal Com for maintenance. When the air bubbles are mixed in the ink, the air bubbles absorb pressure fluctuations, so that there is a problem in that so-called missing dots, in which the ink is not discharged from the nozzles N, or discharge failures, such as curved flight, occur. By executing the flushing process, the occurrence of missing dots and discharge failures is suppressed.

The detection device 8 includes a current supply circuit 81 and a voltage detection circuit 82.

The current supply circuit 81 supplies a current I0 to the liquid discharge head 1. In the present embodiment, the current I0 is a constant current of a predetermined magnitude. In addition, in the present embodiment, a case is assumed in which some or all of the current I0 supplied from the current supply circuit 81 to the liquid discharge head 1 flows from one end of the detection resistor TK provided in the liquid discharge head 1 to the other end. The detection resistor TK will be described later with reference to FIGS. 4, 6, and 7. The detection resistor TK is an example of a "resistor".

A voltage detection circuit 82 detects a voltage VK applied to the detection resistor TK. Here, the voltage VK is the potential difference between one end of the detection resistor TK and the other end. Specifically, in the present embodiment, the voltage detection circuit 82 detects the voltage VK at both ends of the detection resistor TK when some or all of the current I0 supplied from the current supply circuit 81 flows from one end of the detection resistor TK to the other end. The voltage detection circuit 82 outputs a detection result signal DK having a value corresponding to the voltage VK detected from the detection resistor TK to the control section 7.

In the present embodiment, description is performed by illustrating an aspect in which the current supply circuit 81 and the voltage detection circuit 82 are provided outside the liquid discharge head 1. However, the present disclosure is not limited to the aspect. The current supply circuit 81 and the voltage detection circuit 82 may be provided in the liquid discharge head 1.

The processing circuit provided in the control section 7 can function as a temperature specifying section 71 and a signal adjustment section 72 by reading out the program stored in the storage circuit and executing the program.

The temperature specifying section 71 specifies the temperature of the ink in the liquid discharge head 1 based on the detection result signal DK.

The signal adjustment section 72 adjusts the drive signal Com for maintenance based on the temperature specified by the temperature specifying section 71. For example, the signal adjustment section 72 increases the number of pulses included in the drive signal Com for maintenance as the temperature specified by the temperature specifying section 71 increases.

1.2. Outline of Liquid Discharge Head

The outline of the liquid discharge head 1 will be described below with reference to FIGS. 2 and 3.

Figure 2:
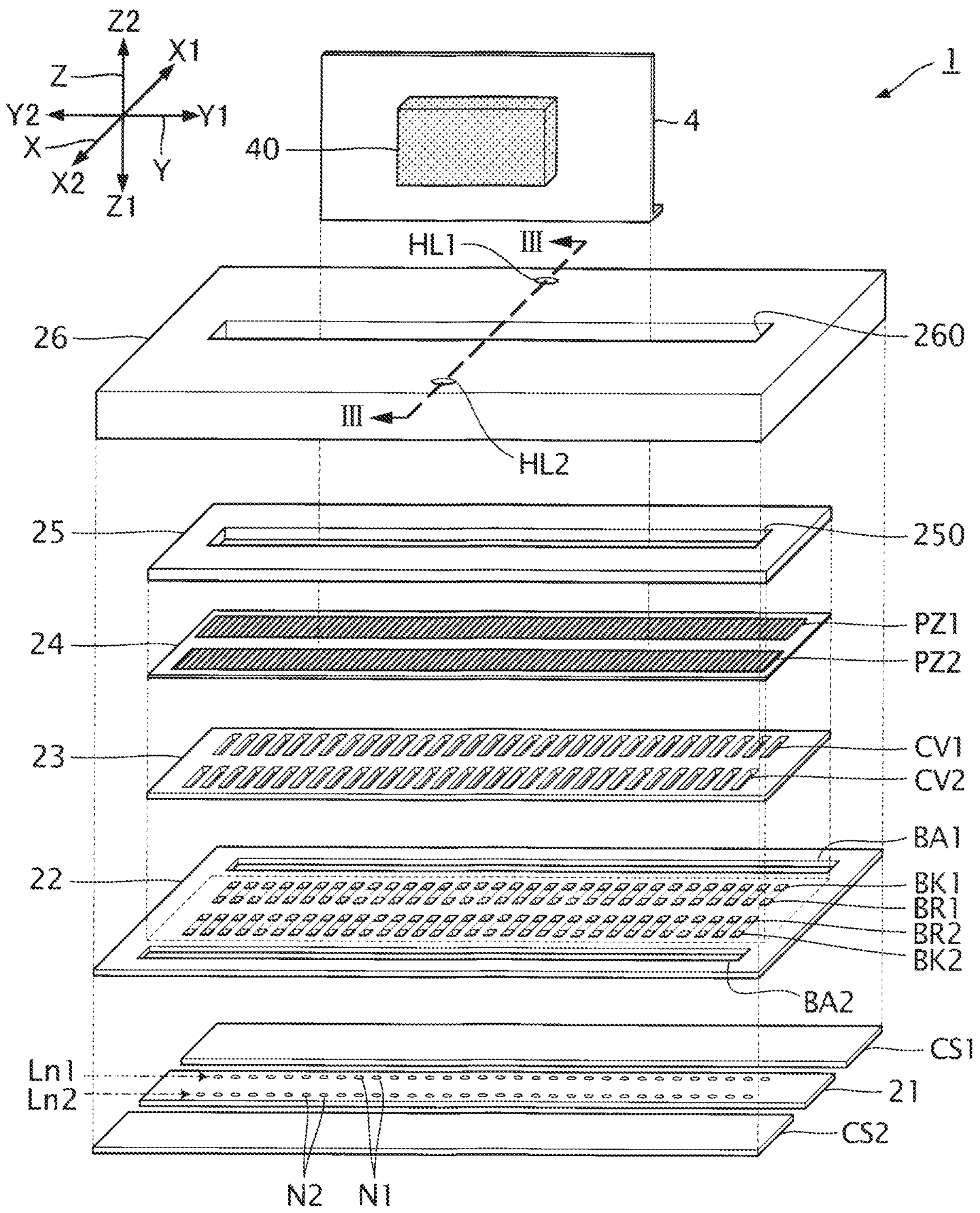
FIG. 2 is an exploded perspective view of a liquid discharge head.

FIG. 2 is an exploded perspective view of the liquid discharge head 1. FIG. 3 is a sectional view taken along line III-III in FIG. 2.

Figure 3:
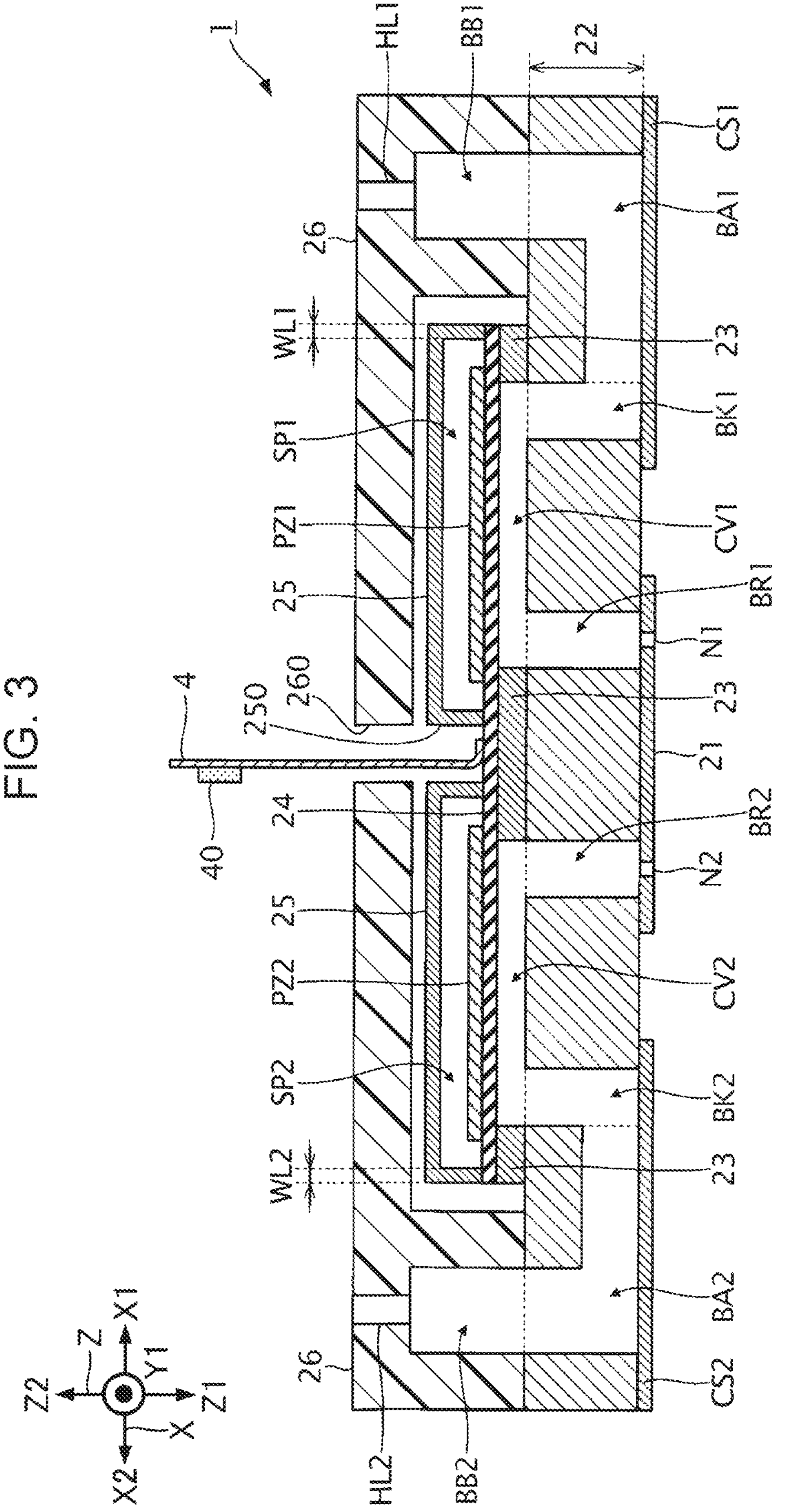
FIG. 3 is a sectional view taken along line III-III in FIG. 2.

As shown in FIGS. 2 and 3, the liquid discharge head 1 includes a nozzle substrate 21, compliance sheets CS1 and CS2, a communication plate 22, a pressure chamber substrate 23, a diaphragm 24, a sealing substrate 25, a flow path forming substrate 26 and a wiring substrate 4.

As shown in FIG. 2, the nozzle substrate 21 is a plate-like member elongated in the Y axis direction and extending substantially parallel to an XY plane. Here, "substantially parallel" is a concept that includes not only a case of being completely parallel but also a case of being considered to be parallel when an error is considered. In the present embodiment, "substantially parallel" is a concept that includes a case where it can be regarded as parallel when an error of about 10% is considered. The nozzle substrate 21 is manufactured, for example, by processing a silicon single crystal substrate using a semiconductor manufacturing technology such as etching, but any known material and manufacturing method may be employed to manufacture the nozzle substrate 21.

The plurality of nozzles N are formed in the nozzle substrate 21. Here, the nozzle N is a through hole provided in the nozzle substrate 21. In the present embodiment, a case is assumed in which the plurality of nozzles N formed in the nozzle substrate 21 include a plurality of nozzles N1 arranged to extend in the Y axis direction, and a plurality of nozzles N2 arranged to extend in the Y axis direction at a position in the X2 direction when viewed from the plurality of nozzles N1. Hereinafter, the plurality of nozzles N1 extending in the Y axis direction are referred to as a nozzle row Ln1, and the plurality of nozzles N2 extending in the Y axis direction are referred to as a nozzle row Ln2. Moreover, below, the nozzle row Ln1 and the nozzle row Ln2 may be collectively referred to as a nozzle row Ln.

As shown in FIGS. 2 and 3, the communication plate 22 is provided at a position in the Z2 direction when viewed from the nozzle substrate 21. The communication plate 22 is a plate-like member elongated in the Y axis direction and extending substantially parallel to the XY plane. The communication plate 22 is manufactured, for example, by processing a silicon single crystal substrate using semiconductor manufacturing technology, but any known material and manufacturing method may be employed to manufacture the communication plate 22.

Ink flow paths are formed in the communication plate 22. Specifically, the communication plate 22 is formed with one supply flow path BA1 provided to extend in the Y axis direction, and one supply flow path BA2 provided to extend in the Y axis direction at a position in the X2 direction when viewed from the supply flow path BA1. In addition, the communication plate 22 is formed with a plurality of coupling flow paths BK1 corresponding to the plurality of nozzles N1, a plurality of coupling flow paths BK2 corresponding to the plurality of nozzles N2, a plurality of communication flow paths BR1 corresponding to the plurality of nozzles N1, and a plurality of communication flow paths BR2 corresponding to the plurality of nozzles N2.

Of these, the coupling flow path BK1 is provided to communicate with the supply flow path BA1 and extend in the Z axis direction at a position in the X2 direction when viewed from the supply flow path BA1. The communication flow path BR1 is provided to extend in the Z axis direction at a position in the X2 direction when viewed from the coupling flow path BK1. The communication flow path BR1 communicates with the nozzle N1 corresponding to the communication flow path BR1. The coupling flow path BK2 is provided to communicate with the supply flow path BA2 and extend in the Z axis direction at a position in the X1 direction when viewed from the supply flow path BA2. The communication flow path BR2 is provided to extend in the Z axis direction at a position in the X1 direction when viewed from the coupling flow path BK2 and at a position in the X2 direction when viewed from the communication flow path BR1. The communication flow path BR2 communicates with the nozzle N2 corresponding to the communication flow path BR2.

Hereinafter, the supply flow path BA1 and supply flow path BA2 may be collectively referred to as a supply flow path BA. Hereinafter, the coupling flow path BK1 and the coupling flow path BK2 may be collectively referred to as a coupling flow path BK. Hereinafter, the communication flow path BR1 and the communication flow path BR2 may be collectively referred to as a communication flow path BR.

As shown in FIGS. 2 and 3, the pressure chamber substrate 23 is provided at a position in the Z2 direction when viewed from the communication plate 22. The pressure chamber substrate 23 is a plate-like member elongated in the Y axis direction and extending substantially parallel to the XY plane. The pressure chamber substrate 23 is manufactured, for example, by processing a silicon single crystal substrate using semiconductor manufacturing technology, but any known material and manufacturing method may be employed to manufacture the pressure chamber substrate 23.

Ink flow paths are formed in the pressure chamber substrate 23. Specifically, the pressure chamber substrate 23 is formed with a plurality of pressure chambers CV1 corresponding to the plurality of nozzles N1 and a plurality of pressure chambers CV2 corresponding to the plurality of nozzles N2. Of these, the pressure chamber CV1 is provided to couple an end portion of the coupling flow path BK1 in the X2 direction and an end portion of the communication flow path BR1 in the X1 direction when viewed in the Z axis direction, and extend in the X axis direction. When viewed in the Z axis direction, the pressure chamber CV2 is provided to couple an end portion of the coupling flow path BK2 in the X1 direction and an end portion of the communication flow path BR2 in the X2 direction, and extend in the X axis direction. Hereinafter, the pressure chamber CV1 and the pressure chamber CV2 may be collectively referred to as a pressure chamber CV.

As shown in FIGS. 2 and 3, the diaphragm 24 is provided at a position in the Z2 direction when viewed from the pressure chamber substrate 23. The diaphragm 24 is a plate-like member elongated in the Y axis direction and extending substantially parallel to the XY plane, and is a member capable of elastic vibration. In the present embodiment, a surface in the Z2 direction, in the two surfaces of the diaphragm 24 whose normal direction is the Z axis direction, is formed of a non-conductive member. Specifically, the diaphragm 24 has an elastic layer formed of silicon oxide and an insulating layer made of zirconium oxide provided at a position in the Z2 direction when viewed from the elastic layer.

As shown in FIGS. 2 and 3, a plurality of piezoelectric elements PZ1 corresponding to the plurality of pressure chambers CV1 and a plurality of piezoelectric elements PZ2 corresponding to the plurality of pressure chambers CV2 are provided at positions in the Z2 direction when viewed from the diaphragm 24. Hereinafter, the piezoelectric element PZ1 and the piezoelectric element PZ2 may be collectively referred to as a piezoelectric element PZ. The piezoelectric element PZ is a passive element that is deformed according to the potential change of the drive signal Com. In other words, the piezoelectric element PZ is an example of an energy conversion element that converts the electric energy of the drive signal Com into kinetic energy. Specifically, the piezoelectric element PZ is driven and deformed according to the potential change of the drive signal Com. The diaphragm 24 vibrates in conjunction with the deformation of the piezoelectric element PZ. When the diaphragm 24 vibrates, the pressure in the pressure chamber CV fluctuates. As the pressure in the pressure chamber CV fluctuates, the ink filled in the pressure chamber CV is discharged from the nozzle N through the communication flow path BR.

As shown in FIGS. 2 and 3, the sealing substrate 25 for protecting the plurality of piezoelectric elements PZ1 and the plurality of piezoelectric elements PZ2 is provided at a position in the Z2 direction when viewed from the pressure chamber substrate 23. The sealing substrate 25 is a plate-like member elongated in the Y axis direction and extending substantially parallel to the XY plane. The sealing substrate 25 is manufactured, for example, by processing a silicon single crystal substrate using semiconductor manufacturing technology, but any known material and manufacturing method may be employed to manufacture the sealing substrate 25.

A surface in the Z1 direction, in the two surfaces of the sealing substrate 25 whose normal direction is the Z axis direction, is provided with a recess for covering the plurality of piezoelectric elements PZ1 and a recess for covering the plurality of piezoelectric elements PZ2. Hereinafter, a sealing space covering the plurality of piezoelectric elements PZ1 and formed between the diaphragm 24 and the sealing substrate 25 is referred to as a sealing space SP1, and a sealing space covering the plurality of piezoelectric elements PZ2 and formed between the diaphragm 24 and the sealing substrate 25 is referred to as a sealing space SP2. Hereinafter, the sealing space SP1 and the sealing space SP2 may be collectively referred to as a sealing space SP. The sealing space SP is a space for sealing the piezoelectric element PZ and preventing the piezoelectric element PZ from being degraded due to the influence of moisture or the like. In addition, hereinafter, when the sealing substrate 25 is viewed from above in the Z1 direction, a portion corresponding to the side wall of the sealing space SP1 is referred to as a side wall WL1, and a portion corresponding to the side wall of the sealing space SP2 is referred to as a side wall WL2. Hereinafter, the side wall WL1 and the side wall WL2 may be collectively referred to as a side wall WL.

A through hole 250 is provided in the sealing substrate 25. The through hole 250 is a hole that is positioned between the sealing space SP1 and the sealing space SP2 when the sealing substrate 25 is viewed in the Z1 direction, and penetrates from a surface of the sealing substrate 25 in the Z1 direction to a surface of the sealing substrate 25 in the Z2 direction. The wiring substrate 4 is inserted into the through hole 250.

As shown in FIGS. 2 and 3, the flow path forming substrate 26 is provided at a position in the Z2 direction when viewed from the communication plate 22. The flow path forming substrate 26 is a plate-like member elongated in the Y axis direction and extending substantially parallel to the XY plane. The flow path forming substrate 26 is formed by, for example, injection molding of a resin material, but any known material and manufacturing method may be employed to manufacture the flow path forming substrate 26.

Ink flow paths are formed in the flow path forming substrate 26. Specifically, one supply flow path BB1 and one supply flow path BB2 are formed in the flow path forming substrate 26. Of these, the supply flow path BB1 communicates with the supply flow path BA1 and is provided to extend in the Y axis direction at a position in the Z2 direction when viewed from the supply flow path BA1. The supply flow path BB2 communicates with the supply flow path BA2 and is provided to extend in the Y axis direction at a position in the Z2 direction when viewed from the supply flow path BA2 and in the X2 direction when viewed from the supply flow path BB1. Hereinafter, the supply flow path BB1 and the supply flow path BB2 may be collectively referred to as a supply flow path BB.

The flow path forming substrate 26 is provided with an inlet HL1 that communicates with the supply flow path BB1 and an inlet HL2 that communicates with the supply flow path BB2.

Ink is supplied from the liquid container 93 to the supply flow path BB1 through the inlet HL1. The ink supplied from the liquid container 93 to the supply flow path BB1 through the inlet HL1 flows into the supply flow path BA1. A part of the ink that has flowed into the supply flow path BA1 passes through the coupling flow path BK1 and fills the pressure chamber CV1. When the piezoelectric element PZ1 is driven by the drive signal Com, a part of the ink filled in the pressure chamber CV1 is discharged from the nozzle N1 through the communication flow path BR1. In addition, ink is supplied to the supply flow path BB2 from the liquid container 93 through the inlet HL2. The ink supplied from the liquid container 93 to the supply flow path BB2 through the inlet HL2 flows into the supply flow path BA2. A part of the ink that flows into the supply flow path BA2 passes through the coupling flow path BK2 and fills the pressure chamber CV2. When the piezoelectric element PZ2 is driven by the drive signal Com, a part of the ink filled in the pressure chamber CV2 is discharged from the nozzle N2 through the communication flow path BR2.

A through hole 260 is provided in the flow path forming substrate 26. The through hole 260 is a hole that is positioned between the supply flow path BB1 and the supply flow path BB2 when the flow path forming substrate 26 is viewed in the Z1 direction, and penetrates from a surface of the flow path forming substrate 26 in the Z1 direction to a surface of the flow path forming substrate 26 in the Z2 direction. The wiring substrate 4 is inserted into the through hole 260.

As shown in FIGS. 2 and 3, the wiring substrate 4 is mounted on the surface of the diaphragm 24 in the Z2 direction. The wiring substrate 4 is a component for electrically coupling the liquid discharge head 1 to the control section 7. As the wiring substrate 4, for example, a flexible wiring substrate, such as FPC or FFC, is preferably employed. Here, FPC is an abbreviation for Flexible Printed Circuit, and FFC is an abbreviation for Flexible Flat Cable. An integrated circuit 40 is mounted on the wiring substrate 4. The integrated circuit 40 is an electric circuit that switches whether or not to supply the drive signal Com to the piezoelectric element PZ under the control of the control signal SI.

As shown in FIGS. 2 and 3, the compliance sheet CS1 is provided at a position in the Z1 direction when viewed from the communication plate 22 so as to block the supply flow path BA1 and the coupling flow path BK1, and, in addition, the compliance sheet CS2 is provided to block the supply flow path BA2 and the coupling flow path BK2. Hereinafter, the compliance sheet CS1 and the compliance sheet CS2 may be collectively referred to as a compliance sheet CS. The compliance sheet CS is a plate-like member elongated in the Y axis direction and extending substantially parallel to the XY plane. The compliance sheet CS is formed of an elastic material and absorbs pressure fluctuations of the ink in the supply flow path BA and the coupling flow path BK.

1.3. Detection Resistor TK

The detection resistor TK can more accurately measure the temperature of the ink in the pressure chamber CV by arranging the detection resistor TK closer to the pressure chamber CV. In the first embodiment, the detection resistor TK is provided between the piezoelectric body Qm, which is a part of the piezoelectric element PZ, and the diaphragm 24, and is provided at a position overlapping the pressure chamber CV when the liquid discharge head 1 is viewed from above in the Z1 direction. Hereinafter, the detection resistor TK will be described with reference to FIGS. 4, 6, and 7.

1.3.1. Structure of Detection Resistor TK

Figure 4:
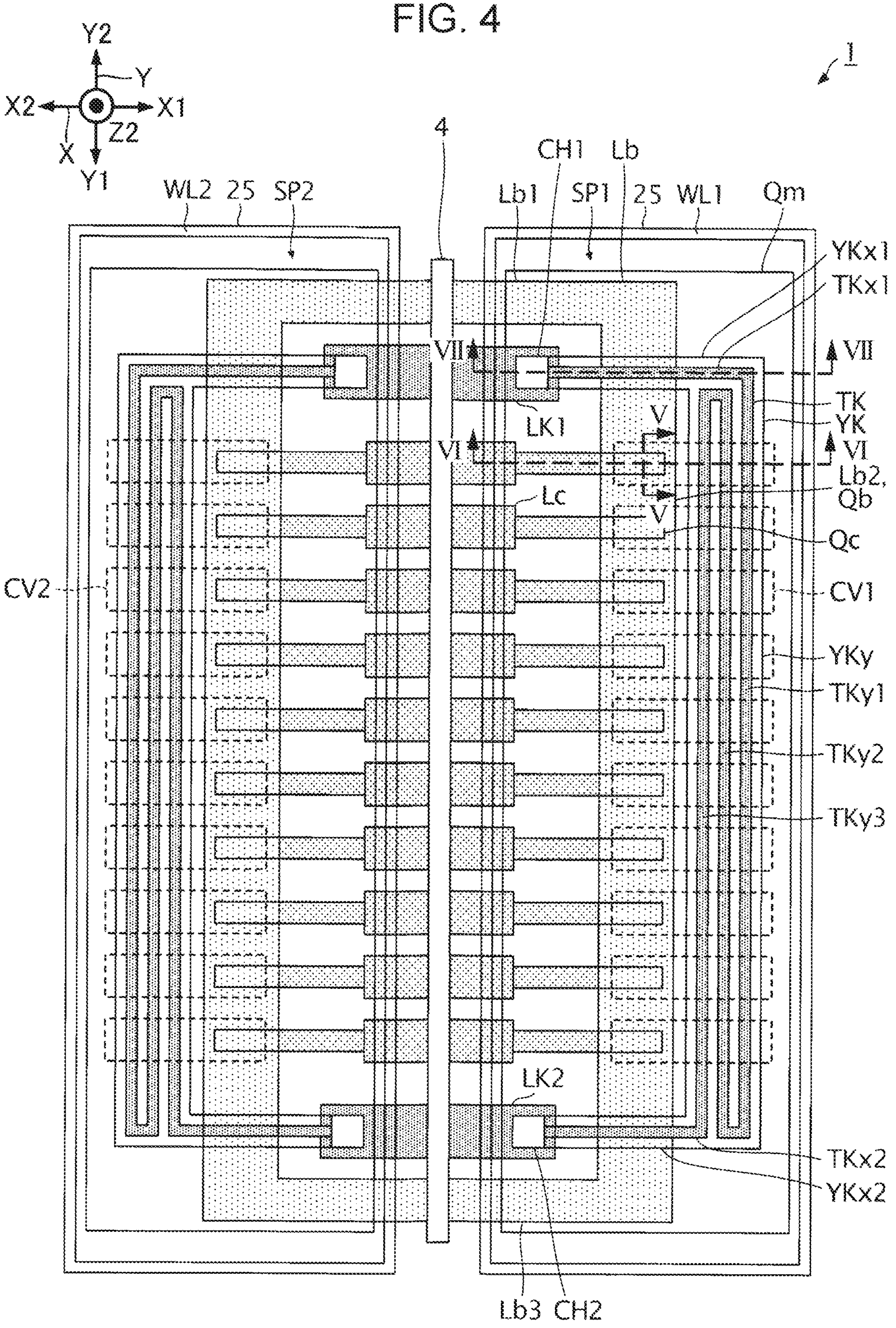
FIG. 4 is a plan view of the liquid discharge head.
Figure 5:
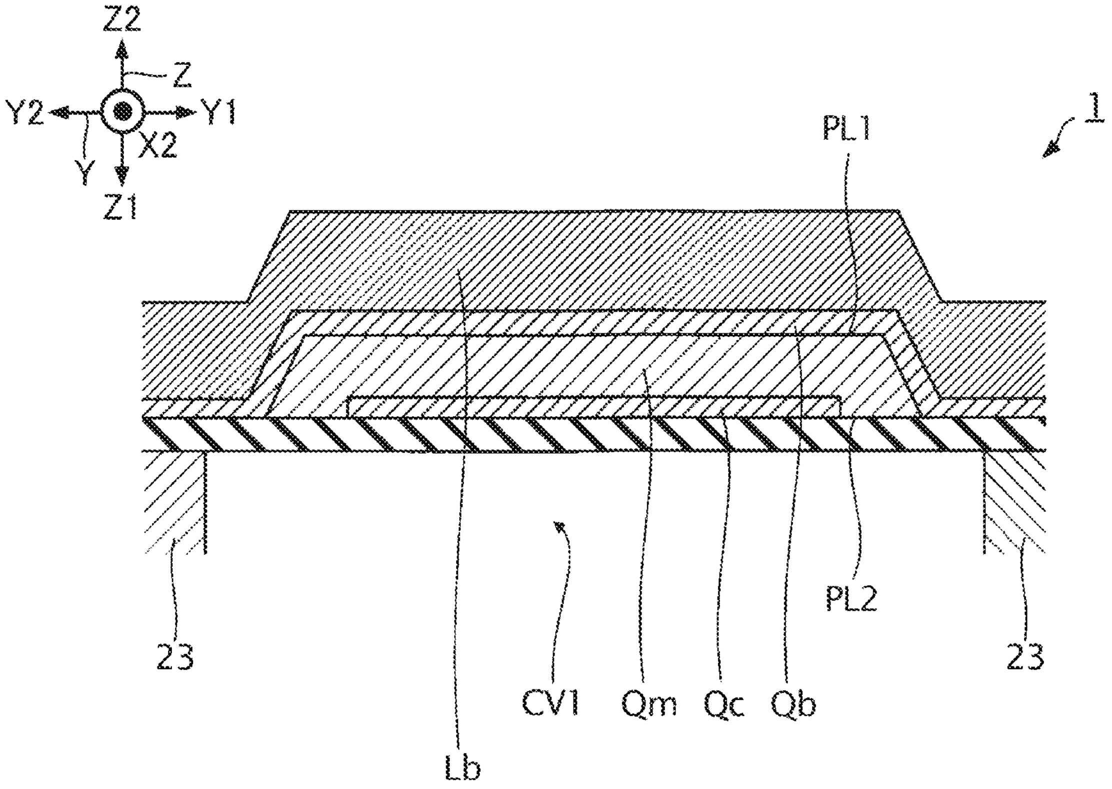
FIG. 5 is a sectional view taken along line V-V in FIG. 4.

FIG. 4 is a plan view of the liquid discharge head 1 when the liquid discharge head 1 is viewed from above in the Z1 direction. FIG. 5 is a sectional view taken along line V-V in FIG. 4. However, in FIG. 4, for easy description, the flow path forming substrate 26 and the integrated circuit 40 are not shown. Furthermore, in FIG. 4, the peripheral edge of an element positioned on the back side of any one element, that is, a portion that is originally hidden by the element on the front side is not shown for convenience.

As shown in FIG. 4, when the liquid discharge head 1 is viewed from above in the Z1 direction, at a position overlapping the sealing space SP1 that is a space positioned inside the side wall WL1 of the sealing substrate 25, the plurality of pressure chambers CV1 corresponding to the plurality of nozzles N1, a plurality of individual electrodes Qc corresponding to the plurality of nozzles N1, a plurality of individual wirings Lc corresponding to the plurality of nozzles N1, the piezoelectric body Qm, a common electrode Qb, and a common wiring Lb, the detection resistor TK, the detection wiring LK1, and the detection wiring LK2 are provided. The plurality of individual wirings Lc and the common wirings Lb are an example of "drive wirings".

Here, the dimension of each portion in FIG. 4 is merely an example, and the actual dimension may be different. For example, a region where the three of the individual electrode Qc, the piezoelectric body Qm, and the common electrode Qb overlap when viewed from the Z axis direction corresponds to a region where the diaphragm 24 vibrates, so-called an active region. The width of the active region in the X axis direction may be longer than the width shown in FIG. 4. The longer the width of the region in the X axis direction, the wider the width in which the diaphragm 24 can vibrate, and the larger the amount of vibration, thereby being preferable in terms of discharge characteristics. The discharge characteristics are one or both of the discharge amount and the discharge speed.

In FIG. 4, the common electrode Qb is formed in a range that does not overlap resistor extending parts Tky1, Tky2, and TKy3, which will be described later, when viewed from the Z axis direction, but may be formed in a range that overlaps the resistor extending parts Tky1, Tky2, and TKy3. That is, the width of the part, which extends in the Y axis direction, of the common electrode Qb in the X axis direction is longer than that shown in FIG. 4, and, as a result, the common electrode Qb may overlap the resistor extending parts Tky1, Tky2, and TKy3.

In FIG. 4, when viewed from the Z axis direction, the common electrode Qb and the common wiring Lb completely overlap, in other words, disposed in the same positional relationship on the XY plane, but the positional relationship may be different. For example, the common electrode Qb may be formed as shown in FIG. 4, and the common wiring Lb may be divided into two at a portion extending in the Y axis direction.

The detection resistor TK is a resistance wiring used to measure the temperature of the ink in the pressure chamber CV1, and the electric resistance of the detection resistor TK changes according to the temperature of the detection resistor TK. The temperature specifying section 71 uses a property that the electric resistance of the detection resistor TK changes according to the temperature of the detection resistor TK to estimate the temperature of the ink in the pressure chamber CV1 based on the detection result signal DK having a value corresponding to the voltage VK detected from the detection resistor TK.

One end of the detection resistor TK is coupled to a contact hole CH1 of the detection wiring LK1. The detection resistor TK is electrically coupled to the wiring provided on the wiring substrate 4 through the detection wiring LK1. The other end of the detection resistor TK is coupled to a contact hole CH2 of the detection wiring LK2. The detection resistor TK is electrically coupled to the wiring provided on the wiring substrate 4 through the detection wiring LK2.

The detection resistor TK includes a resistor extending part TKx1, the resistor extending part TKy1, the resistor extending part TKy2, the resistor extending part TKy3, and a resistor extending part TKx2.

The resistor extending part TKx1 extends in the X axis direction. One end of the resistor extending part TKx1 is coupled to the contact hole CH1 of the detection wiring LK1, and the other end is coupled to the resistor extending part TKy1. The resistor extending part TKy1 extends in the Y axis direction. One end of the resistor extending part TKy1 is coupled to the resistor extending part TKx1, and the other end is coupled to the resistor extending part TKy2. The resistor extending part TKy2 extends in the Y axis direction at a position closer to the wiring substrate 4 than the resistor extending part TKy1. One end of the resistor extending part TKy2 is coupled to the resistor extending part TKy1, and the other end is coupled to the resistor extending part TKy3. The resistor extending part TKy3 extends in the Y axis direction at a position closer to the wiring substrate 4 than the resistor extending part TKy2. One end of the resistor extending part TKy3 is coupled to the resistor extending part TKy2, and the other end is coupled to the resistor extending part TKx2. The resistor extending part TKx2 extends in the X axis direction at a position in the Y1 direction from the resistor extending part TKx1. One end of the resistor extending part TKx2 is coupled to the contact hole CH2 of the detection wiring LK2, and the other end is coupled to the resistor extending part TKy3.

The current I0, which is a constant current of a predetermined magnitude, is supplied from the current supply circuit 81 to the detection wiring LK1 through the wiring on the wiring substrate 4. The wiring on the wiring substrate 4 set to the ground potential is electrically coupled to the detection wiring LK2. For this reason, the current I0 supplied to the detection wiring LK1 flows from the detection wiring LK1 to the wiring on the wiring substrate 4, to which the detection wiring LK2 is electrically coupled, through the resistor extending part TKx1, the resistor extending part TKy1, the resistor extending part TKy2, the resistor extending part TKy3, the resistor extending part TKx2, and the detection wiring LK2.

The detection resistor TK is formed of a conductive material whose electric resistance value is dependent on the temperature. Specifically, as the material of the detection resistor TK, for example, gold, platinum, iridium, aluminum, copper, titanium, tungsten, nickel, chromium, or the like can be employed.

In addition, the detection wiring LK1 and the detection wiring LK2 are formed of a conductive material. As the materials of the detection wiring LK1 and the detection wiring LK2, for example, gold, copper, titanium, tungsten, nickel, chromium, platinum, aluminum, or the like can be employed. In the present embodiment, as the material of the detection wiring LK1 and the detection wiring LK2, a material having an electric resistance value smaller than the electric resistance value of the detection resistor TK is employed. For this reason, in the present embodiment, the voltage VK between both ends of the detection resistor TK can be accurately grasped, as compared to an aspect in which a material having a larger electric resistance value than the detection resistor TK is used as the materials of the detection wiring LK1 and the detection wiring LK2. However, the present disclosure is not limited to the aspect. For example, the detection wiring LK1 and the detection wiring LK2 may be formed of the same material as the detection resistor TK.

The common wiring Lb includes a partial wiring Lb1, a partial wiring Lb2, and a partial wiring Lb3.

The partial wiring Lb1 extends in the X axis direction. One end of the partial wiring Lb1 is electrically coupled to the wiring provided on the wiring substrate 4, and the other end is coupled to the partial wiring Lb2. The partial wiring Lb2 extends in the Y axis direction. One end of the partial wiring Lb2 is coupled to the partial wiring Lb1, and the other end is coupled to the partial wiring Lb3. The partial wiring Lb3 extends in the X axis direction. One end of the partial wiring Lb3 is coupled to the partial wiring Lb2, and the other end is electrically coupled to the wiring provided on the wiring substrate 4.

The wiring on the wiring substrate 4 to which the partial wiring Lb1 is electrically coupled and the wiring on the wiring substrate 4 to which the partial wiring Lb3 is electrically coupled are set to a predetermined reference potential VBS. Therefore, the potential of the common wiring Lb is also set to the reference potential VBS.

The common electrode Qb is provided in a region overlapping with the partial wiring Lb2 when the liquid discharge head 1 is viewed from above in the Z1 direction. In the present embodiment, the common electrode Qb is commonly provided for the plurality of pressure chambers CV1. More specifically, the common electrode Qb is provided to overlap the plurality of pressure chambers CV1 when the liquid discharge head 1 is viewed from above in the Z1 direction. The common electrode Qb is provided so that, when the liquid discharge head 1 is viewed from above in the Z1 direction, some or all of the plurality of pressure chambers CV1 have portions that do not overlap the common electrode Qb.

As shown in FIG. 5, the common electrode Qb is provided on the surface PL1 of the piezoelectric body Qm. In the first embodiment, the common electrode Qb is a so-called upper electrode.

The common electrode Qb is coupled to the partial wiring Lb2. Therefore, the potential of the common electrode Qb is set to the reference potential VBS. Here, in the first embodiment, the common electrode Qb is an example of a "first electrode".

The common electrode Qb is formed of a conductive material. Specifically, as the material of the common electrode Qb, for example, a metal such as platinum, iridium, gold, or titanium, or a conductive material such as a conductive metal oxide including indium tin oxide abbreviated as ITO can be employed.

In addition, the common wiring Lb is formed of a conductive material. Specifically, as the material of the common wiring Lb, for example, gold, copper, titanium, tungsten, nickel, chromium, platinum, aluminum, or the like can be employed.

The piezoelectric body Qm is provided in common for a plurality of pressure chambers CV1. More specifically, when the liquid discharge head 1 is viewed from above in the Z1 direction, the piezoelectric body Qm is provided to overlap the plurality of pressure chambers CV1. However, when the liquid discharge head 1 is viewed above in the Z1 direction, some or all of the plurality of pressure chambers CV1 may be provided to have parts that do not overlap the piezoelectric body Qm.

The piezoelectric body Qm includes a crystal film having a perovskite structure formed of a ferroelectric ceramic material exhibiting an electromechanical conversion action, that is, a so-called perovskite type crystal. Specifically, as the material of the piezoelectric body Qm, for example, a ferroelectric piezoelectric material such as lead zirconate titanate, or a material obtained by adding niobium oxide, nickel oxide, or a metal oxide such as magnesium oxide to the ferroelectric piezoelectric material such as lead zirconate titanate can be employed. More specifically, as the material of the piezoelectric body Qm, for example, lead titanate, lead zirconate titanate, lead zirconate, lead lanthanum titanate, lead lanthanum zirconate titanate, or magnesium niobate-lead zirconate titanate, or the like can be employed. That is, the piezoelectric body Qm is made of a lead compound and contains lead atoms.

The piezoelectric body Qm can be formed by forming the piezoelectric material described above by a known film forming technology such as sputtering, and baking the piezoelectric material at a high temperature by a known processing technology such as photolithography.

As described above, the liquid discharge head 1 is provided with the plurality of individual electrodes Qc corresponding to the plurality of pressure chambers CV1. In addition, the liquid discharge head 1 is provided with the plurality of individual wirings Lc corresponding to the plurality of individual electrodes Qc. The drive signal Com is supplied from the control section 7 to each individual wiring Lc through the wiring provided on the wiring substrate 4. As illustrated in FIG. 5, the individual electrode Qc is provided on the surface PL2 of the piezoelectric body Qm. In the first embodiment, the individual electrode Qc is a so-called lower electrode. In the first embodiment, the individual electrode Qc is an example of a "second electrode".

The individual wiring Lc is formed of a conductive material. Specifically, as the material of the individual wiring Lc, for example, gold, copper, titanium, tungsten, nickel, chromium, platinum, aluminum, or the like can be employed.

In addition, the individual electrode Qc is formed of a conductive material. Specifically, as the material of the individual electrode Qc, for example, a metal such as platinum, iridium, gold, or titanium, or a conductive material such as a conductive metal oxide including indium tin oxide abbreviated as ITO can be employed. In the present embodiment, as an example, a case is assumed in which the detection resistor TK is formed of the same material as the individual electrode Qc and the common electrode Qb. Specifically, in the present embodiment, as an example, a case is assumed in which the detection resistor TK, the individual electrode Qc, and the common electrode Qb are formed of platinum.

The piezoelectric element PZ is a laminated body in which a piezoelectric body Qm is interposed between the common electrode Qb which is set at a reference potential VBS and the individual electrode Qc to which the drive signal Com is supplied. When the liquid discharge head 1 is viewed from above in the Z1 direction, a portion where the piezoelectric body Qm, the common electrode Qb, and the individual electrode Qc corresponding to one pressure chamber CV1 overlap corresponds to the piezoelectric element PZ corresponding to one pressure chamber CV1. The pressure chamber CV1 corresponding to the piezoelectric element PZ is provided at a position of the piezoelectric element PZ in the Z1 direction.

As described above, the piezoelectric element PZ is driven and deformed according to the potential change of the drive signal Com. The diaphragm 24 vibrates in conjunction with the deformation of the piezoelectric element PZ. When the diaphragm 24 vibrates, the pressure in the pressure chamber CV1 fluctuates. When the pressure in the pressure chamber CV1 fluctuates, the ink filled in the pressure chamber CV1 is discharged from the nozzle N1 through the communication flow path BR1.

1.3.2. Role of Detection Resistor TK

The current I0 supplied from the current supply circuit 81 to the detection wiring LK1 flows to the detection wiring LK2 set to the ground potential through the detection resistor TK. Therefore, the voltage VK applied between one end of the detection resistor TK coupled to the detection wiring LK1 and the other end of the detection resistor TK coupled to the detection wiring LK2 is represented as "VK=I0*RK" using the resistance value RK between the one end and the other end of the detection resistor TK. That is, when the current I0 is supplied from the current supply circuit 81 to the detection resistor TK through the detection wiring LK1, the voltage detection circuit 82 detects the voltage VK indicating a value "I0*RK" from the detection resistor TK.

Since the resistance value RK changes according to the temperature of the detection resistor TK, the temperature specifying section 71 can specify the temperature of the pressure chamber CV1 based on the detection result signal DK indicating the voltage VK detected by the voltage detection circuit 82. The characteristic of the resistance value RK according to the temperature of the detection resistor TK can be specified by determining the material of the detection resistor TK and the shape of the detection resistor TK. The constituent material of the detection resistor TK and the shape of the detection resistor TK are items determined by the developer of the liquid discharge head 1. The storage circuit of the control section 7 stores a table showing the relationship between a plurality of temperatures that the detection resistor TK can take and the resistance value RK at each of the plurality of temperatures that the detection resistor TK can take. Since the current I0 has a predetermined magnitude, the resistance value RK and the voltage VK are in a proportional relationship. Therefore, the storage circuit of the control section 7 may store a table showing the relationship between a plurality of temperatures that the detection resistor TK can take and the voltage VK at each of the plurality of temperatures that the detection resistor TK can take. Hereinafter, for ease of understanding, description is performed while assuming that the storage circuit of the control section 7 stores a table showing the relationship between a plurality of temperatures that the detection resistor TK can take and the resistance value RK at each of the plurality of temperatures that the detection resistor TK can take. The temperature specifying section 71 refers to the table and specifies the temperature of the pressure chamber CV1 based on the detection result signal DK.

However, when the piezoelectric body Qm and the detection resistor TK are used together, there is a case where the accuracy of temperature measurement by the detection resistor TK decreases. When the accuracy of temperature measurement decreases, even when the drive signal Com for maintenance is adjusted by the signal adjustment section 72, the thickened ink in the liquid discharge head 1 and the air bubbles mixed in the ink cannot be sufficiently removed, thereby increasing the possibility that missing dots and discharge failures occur. In addition, since the discharge characteristics change according to the temperature, when the accuracy of temperature measurement decreases, there is a problem in that the desired discharge characteristics cannot be obtained even when the drive signal Com or the like is adjusted according to the measured temperature.

A fact that the cause of the decrease in the accuracy of temperature measurement by the detection resistor TK is the diffusion of lead atoms from the piezoelectric body Qm to the detection resistor TK is obtained through experiments by the inventors. When the piezoelectric body Qm is baked and the lead atoms contained in the piezoelectric body Qm diffuse to the detection resistor TK, the material of the detection resistor TK differs from the material assumed by the developer of the liquid discharge head 1. Therefore, the characteristic of the resistance value RK according to the temperature of the detection resistor TK indicated by the table stored in the storage circuit of the control section 7 is different from the characteristic of the resistance value RK according to the actual temperature of the detection resistor TK. Therefore, it is considered that the accuracy of temperature measurement by the detection resistor TK decreases.

Therefore, the liquid discharge head 1 according to the first embodiment has the diffusion suppression layer YK in order to suppress diffusion of the lead atoms contained in the piezoelectric body Qm to the detection resistor TK. The diffusion suppression layer YK is provided between the piezoelectric body Qm and the detection resistor TK. Another layer may be provided between the piezoelectric body Qm and the diffusion suppression layer YK, or another layer may be provided between the diffusion suppression layer YK and the detection resistor TK.

In the first embodiment, the diffusion suppression layer YK is provided to cover the detection resistor TK. More specifically, the detection resistor TK contacts the diaphragm 24 in the Z1 direction, and contacts the detection resistor TK in directions other than the Z1 direction, specifically, the Z2 direction, the X axis direction, and the Y axis direction. Therefore, in the first embodiment, the detection resistor TK does not contact the piezoelectric body Qm. The diffusion suppression layer YK also contacts the diaphragm 24. The diffusion suppression layer YK includes a suppression layer extending part YKx1, a suppression layer extending part YKy, and a suppression layer extending part YKx2.

The diffusion suppression layer YK may be provided between the piezoelectric body Qm and the individual electrode Qc, or the diffusion suppression layer YK may not be provided between the piezoelectric body Qm and the individual electrode Qc. In the first embodiment, it is assumed that the diffusion suppression layer YK is not provided between the piezoelectric body Qm and the individual electrode Qc.

The suppression layer extending part YKx1 extends in the X axis direction. One end of the suppression layer extending part YKx1 is coupled to the contact hole CH1, and the other end is coupled to the suppression layer extending part YKy. The suppression layer extending part YKx1 is provided to cover the resistor extending part TKx1.

The suppression layer extending part YKy extends in the Y axis direction. One end of the suppression layer extending part YKy is coupled to the suppression layer extending part YKx1, and the other end is coupled to the suppression layer extending part YKx2. The suppression layer extending part YKy is provided to cover the resistor extending part TKy1, the resistor extending part TKy2, and the resistor extending part TKy3.

The suppression layer extending part YKx2 extends in the X axis direction. One end of the suppression layer extending part YKx2 is coupled to the contact hole CH2, and the other end is coupled to the suppression layer extending part YKy. The suppression layer extending part YKx2 is provided to cover the resistor extending part TKx2.

The diffusion suppression layer YK is made of, for example, an oxide containing any of metal atoms of zirconium, hafnium, iridium, ruthenium, rhodium, and osmium. In the present embodiment, it is assumed that the diffusion suppression layer YK is made of zirconium oxide.

In FIGS. 4 and 5 and FIGS. 6 and 7, which will be described later, the configuration of the portion, which corresponds to the sealing space SP1 positioned in the X1 direction from the wiring substrate 4, of the liquid discharge head 1 is illustrated and described. However, the same description as in FIGS. 4, 5, 6, and 7 also corresponds to the configuration of the portion corresponding to the sealing space SP2 positioned in the X2 direction from the wiring substrate 4.

Figure 6:
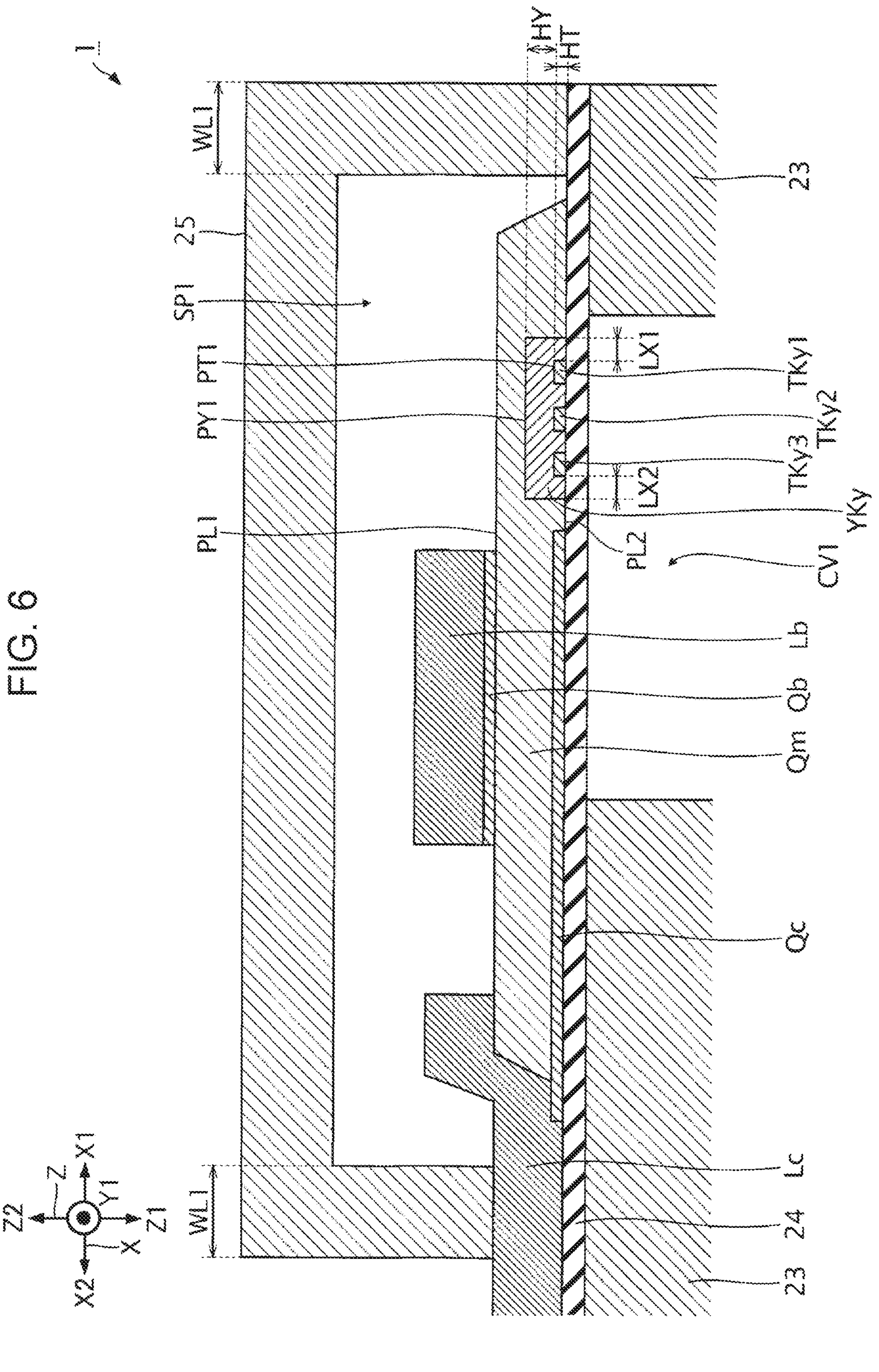
FIG. 6 is a sectional view taken along line VI-VI in FIG. 4.

FIG. 6 is a sectional view taken along line VI-VI in FIG. 4.

As shown in FIG. 6, a surface in the Z2 direction, in the two surfaces of the diaphragm 24 whose normal direction is the Z axis direction, is formed with the piezoelectric element PZ1, the detection resistor TK, the diffusion suppression layer YK, and the sealing substrate 25.

Hereinafter, in the two surfaces of the piezoelectric body Qm having the Z axis direction as the normal direction, a surface in the Z2 direction is referred to as a surface PL1, and a surface in the Z1 direction is referred to as a surface PL2. The surface PL1 is an example of a “first surface”, and the surface PL2 is an example of a “second surface”.

The common electrode Qb and a part of the individual wiring Lc are formed on the surface PL1 of the piezoelectric body Qm. In the two surfaces of the common electrode Qb having the Z axis direction as a normal direction, a surface in the Z2 direction is formed with a partial wiring Lb2 which is a part of the common wiring Lb.

An individual electrode Qc and a diffusion suppression layer YK are formed on the surface PL2 of the piezoelectric body Qm. The detection resistor TK is formed on the surface PL2 through the diffusion suppression layer YK. The detection resistor TK is provided closer to the surface PL2 than the surface PL1. In the present embodiment, the detection resistor TK and the diffusion suppression layer YK are provided at positions that overlap the sealing space SP when the liquid discharge head 1 is viewed in the Z1 direction. That is, in the present embodiment, the detection resistor TK and the diffusion suppression layer YK are provided at positions that do not overlap the side wall WL1 of the sealing substrate 25 when the liquid discharge head 1 is viewed in the Z1 direction.

As shown in FIG. 6, the thickness HT of the detection resistor TK is less than the thickness HY of the diffusion suppression layer YK. The thickness HY is the shortest distance from the surface PY1 of the diffusion suppression layer YK facing the Z2 direction to the surface PT1 of the detection resistor TK facing the Z2 direction. In addition, a distance LX1 from the end portion of the suppression layer extending part YKy in the X1 direction to the end portion of the resistor extending part TKy1 in the X1 direction, and a distance LX2 from the end portion of the suppression layer extending part YKy in the X2 direction to the end portion of the resistor extending part TKy3 in the X2 direction are preferably longer than the thickness HT.

Figure 7:
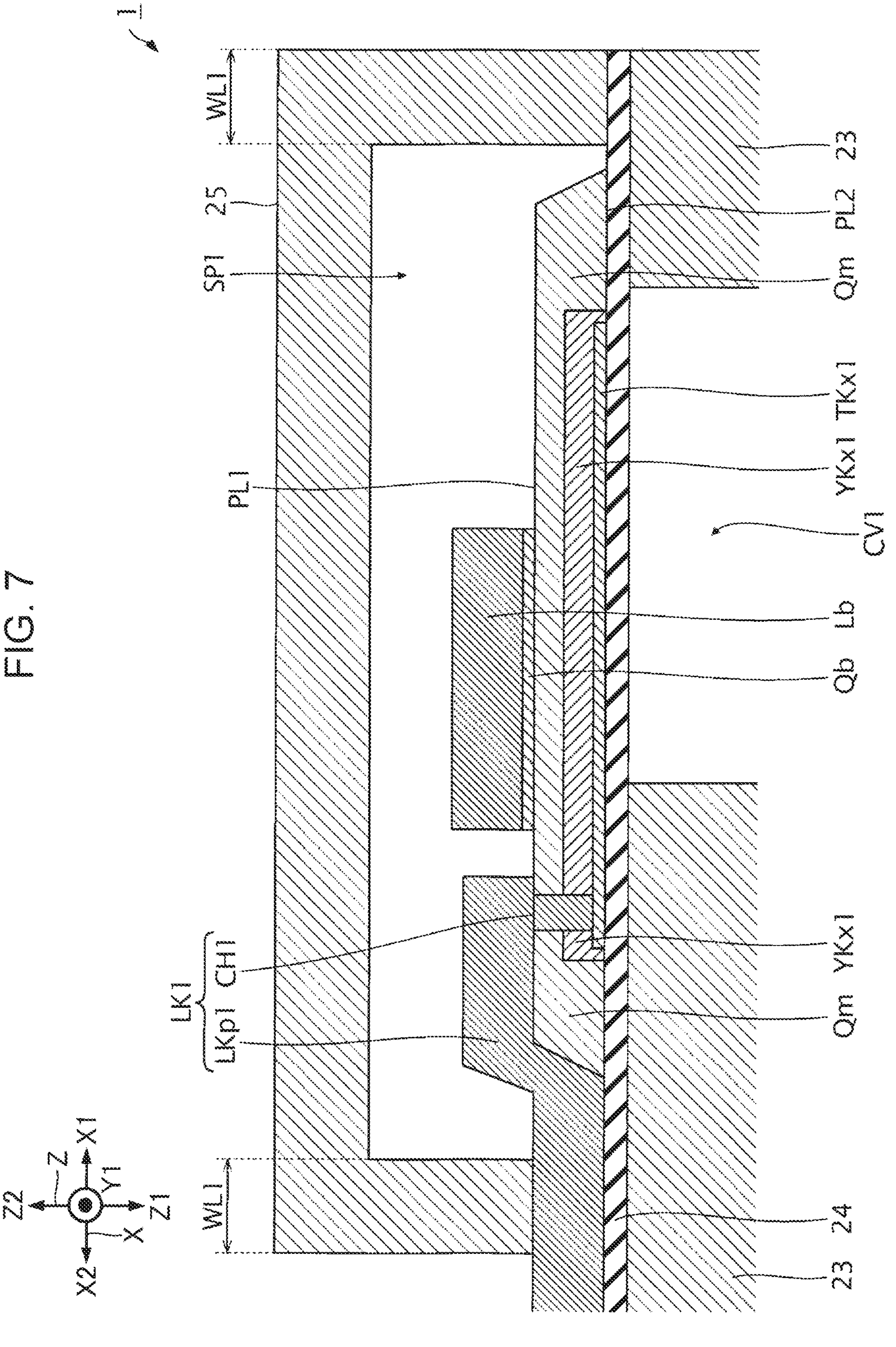
FIG. 7 is a sectional view taken along line VII-VII in FIG. 4.

FIG. 7 is a sectional view taken along line VII-VII in FIG. 4.

As shown in FIG. 7, the detection wiring LK1 has a wiring portion LKp1 and a contact hole CH1. In the two surfaces of the diaphragm 24 having the Z axis direction as a normal direction, a surface in the Z2 direction is formed with the wiring portion LKp1, the detection resistor TK, the diffusion suppression layer YK, and the piezoelectric body Qm, and the sealing substrate 25.

The wiring portion LKp1 and the common electrode Qb are formed on the surface PL1 of the piezoelectric body Qm. In the two surfaces of the common electrode Qb having the Z axis direction as a normal direction, a surface in the Z2 direction is formed with a partial wiring Lb2 which is a part of the common wiring Lb.

The diffusion suppression layer YK is formed on the surface PL2 of the piezoelectric body Qm. The detection resistor TK is provided on the surface PL2 through the diffusion suppression layer YK. The detection resistor TK and the wiring portion LKp1 are electrically coupled by the contact hole CH1 penetrating the piezoelectric body Qm and the diffusion suppression layer YK.

In the present embodiment, a case is assumed in which the detection wiring LK2 has the same configuration as the detection wiring LK1, the resistor extending part TKx2 has the same configuration as the resistor extending part TKx1, the suppression layer extending part YKx2 has the same configuration as the suppression layer extending part YKx1, and the partial wiring Lb3 has the same configuration as the partial wiring Lb1.

1.4. Summary of First Embodiment

As described above, the liquid discharge head 1 according to the present embodiment includes the pressure chamber substrate 23 that is provided with the plurality of pressure chambers CV, the piezoelectric body Qm that is driven to apply pressure to the ink in the plurality of pressure chambers CV, and contains lead atoms, a common electrode Qb that is provided on the surface PL1 of the two surfaces of the piezoelectric body Qm, the individual electrode Qc that is provided on the surface PL2 opposite to the surface PL1 of the two surfaces of the piezoelectric body Qm, the individual wiring Lc and the common wiring Lb that are electrically coupled to the common electrode Qb and the individual electrode Qc, and apply a voltage for driving the piezoelectric body Qm, the detection resistor TK that is formed of the same material as any of the common electrode Qb, the individual electrode Qc, the individual wiring Lc, and the common wiring Lb to measure the temperature of the ink in the plurality of pressure chambers CV, and the diffusion suppression layer YK that is provided between the detection resistor TK and the piezoelectric body Qm to suppress the diffusion of the lead atoms contained in the piezoelectric body Qm into the detection resistor TK.

The diffusion suppression layer YK provided between the detection resistor TK and the piezoelectric body Qm suppresses the diffusion of the lead atoms into the detection resistor TK. Therefore, in the liquid discharge head 1 according to the first embodiment, even when the piezoelectric body Qm and the detection resistor TK are used together, the accuracy of temperature measurement by the detection resistor TK can be improved, as compared to an aspect in which the diffusion suppression layer YK is not included. By improving the accuracy of temperature measurement by the detection resistor TK, there is a high possibility that the thickened ink in the liquid discharge head 1 and the air bubbles mixed in the ink are sufficiently removed, thereby suppressing the possibility that missing dots and discharge failures occur. In addition, the discharge characteristics can be brought closer to desired conditions.

In addition, the diffusion suppression layer YK is made of an oxide containing any of metal atoms of zirconium, hafnium, iridium, ruthenium, rhodium, and osmium.

The lead atoms existing as an oxide in the piezoelectric body Qm cannot exist as an oxide as the piezoelectric body Qm is baked at a high temperature, the lead atoms are diffused into the detection resistor TK in an aspect in which the diffusion suppression layer YK is not included. In contrast, in the first embodiment, a mechanism is conceivable in which the lead atoms diffused from the piezoelectric body Qm receive oxygen atoms from the oxide in the diffusion suppression layer YK, and are stabilized again as the oxide in the diffusion suppression layer YK. As described above, according to the first embodiment, since the diffusion suppression layer YK includes the oxide of the metal atom described above, the accuracy of temperature measurement by the detection resistor TK can be improved, as compared to the aspect in which the diffusion suppression layer YK is not included.

In addition, since it is difficult to transmit the heat of the detection resistor TK to the outside due to the diffusion suppression layer YK provided between the detection resistor TK and the piezoelectric body Qm, the temperature of the detection resistor TK approaches the temperature of the ink in the pressure chamber CV, as compared to the aspect in which the diffusion suppression layer YK is not included. Therefore, the liquid discharge head 1 according to the first embodiment can improve the accuracy of temperature measurement by the detection resistor TK, as compared to the aspect in which the diffusion suppression layer YK is not included.

In addition, the liquid discharge head 1 further includes the diaphragm 24 that is provided to be closer to the surface PL2 than the surface PL1 of the piezoelectric body Qm and vibrates when the piezoelectric body Qm is driven, in which the common electrode Qb is commonly provided for the plurality of pressure chambers CV, and the individual electrodes Qc are individually provided for the plurality of pressure chambers CV. Even in an aspect in which the common electrode Qb is the so-called upper electrode and the individual electrode Qc is the so-called lower electrode, the accuracy of temperature measurement by the detection resistor TK can be improved. Therefore, according to the first embodiment, the degree of freedom in the configuration of the piezoelectric element PZ can be improved.

In addition, the detection resistor TK is formed of the same material as the individual electrode Qc. In the present embodiment, the detection resistor TK and the individual electrodes Qc are formed of platinum.

The liquid discharge head 1 according to the first embodiment can suppress an increase in the manufacturing cost of the liquid discharge head 1 due to the provision of the detection resistor TK, as compared to an aspect in which the detection resistor TK and the individual electrode Qc are formed of different materials.

In addition, the detection resistor TK is provided closer to the surface PL2 than the surface PL1 of the piezoelectric body Qm.

That is, since the detection resistor TK and the individual electrode Qc are provided in the same layer, the liquid discharge head 1 according to the first embodiment can pattern the detection resistor TK and the individual electrode Qc at the same time. For this reason, according to the liquid discharge head 1 according to the first embodiment, it is possible to suppress the increase in the manufacturing cost of the liquid discharge head 1 due to the provision of the detection resistor TK, as compared to an aspect in which the detection resistor TK and the individual electrode Qc are provided in different layers.

In addition, the diaphragm 24 includes an insulating layer made of zirconium oxide, and the diffusion suppression layer YK contains zirconium oxide. That is, the insulating layer of the diaphragm 24 and the diffusion suppression layer YK contain the same molecules.

In general, when the same molecules are contained in two objects, the interfacial adhesion tends to be higher than a case where the same molecules are not contained. Therefore, it is possible to suppress the diffusion suppression layer YK from peeling off from the diaphragm 24, as compared to a case where the diffusion suppression layer YK does not contain zirconium oxide. When the diffusion suppression layer YK is peeled from the diaphragm 24, there is a high possibility that the detection resistor TK is peeled from the diaphragm 24 along with the diffusion suppression layer YK. When the detection resistor TK is peeled from the diaphragm 24, it becomes difficult to conduct heat from the diaphragm 24 to the diffusion suppression layer YK. Therefore, when the detection resistor TK is peeled from the diaphragm 24, the temperature of the detection resistor TK is separated from the temperature of the ink in the pressure chamber CV, as compared to a case where the detection resistor TK is adhered to the diaphragm 24. Therefore, according to the liquid discharge head 1 according to the first embodiment, it is possible to improve the accuracy of temperature measurement by the detection resistor TK, as compared to an aspect in which the diffusion suppression layer YK does not contain zirconium oxide.

In addition, the detection resistor TK contains platinum.

Platinum is preferably employed as the material of the electrodes, and the material of the individual electrodes Qc is also platinum in the first embodiment. Therefore, when the detection resistor TK contains platinum, it is possible to suppress the increase in the manufacturing cost of the liquid discharge head 1 due to the provision of the detection resistor TK, as compared to an aspect in which the detection resistor TK and the individual electrode Qc are formed of different materials.

In addition, the thickness HT of the detection resistor TK is less than the thickness HY of the diffusion suppression layer YK. As the thickness of the diffusion suppression layer YK increases, the diffusion of lead atoms into the detection resistor TK can be suppressed. In addition, since the temperature specifying section 71 specifies the temperature based on the resistance value RK, the noise value relative to the resistance value RK decreases as the value of the resistance value RK increases, the accuracy of temperature measurement can be improved by the detection resistor TK. In general, in order to increase the resistance value of an electric wire, the length of the electric wire is increased and the sectional area of the electric wire is decreased. Therefore, as the thickness of the detection resistor TK is reduced, the accuracy of temperature measurement by the detection resistor TK can be further improved. Therefore, the liquid discharge head 1 according to the first embodiment can improve the accuracy of temperature measurement by the detection resistor TK, as compared to the aspect in which the thickness HT of the detection resistor TK is more than the thickness HY of the diffusion suppression layer YK. In addition, in the liquid discharge head 1 according to the first embodiment, the detection resistor TK is disposed to be bent on the XY plane as shown in FIG. 4 to increase the length of the detection resistor TK, thereby improving the accuracy of temperature measurement by the detection resistor TK.

In addition, the diffusion suppression layer YK is not provided between the piezoelectric body Qm and the individual electrode Qc.

When the diffusion suppression layer YK is provided between the piezoelectric body Qm and the individual electrode Qc, there is a possibility that the electrification characteristics of the piezoelectric element PZ reaching the common electrode Qb from the individual electrode Qc through the piezoelectric body Qm change, as compared to an aspect in which the diffusion suppression layer YK is not provided between the piezoelectric body Qm and the individual electrode Qc. Therefore, even when the piezoelectric element PZ is driven by the drive signal Com, there is a high probability that discharge failures occur, as compared to an aspect in which the diffusion suppression layer YK is not provided between the piezoelectric body Qm and the individual electrode Qc. Therefore, the liquid discharge head 1 according to the first embodiment can reduce the possibility that discharge failures occur, as compared to the aspect in which the diffusion suppression layer YK is provided between the piezoelectric body Qm and the individual electrode Qc.

The liquid discharge device 100 according to the first embodiment includes the liquid discharge head 1, and the control section 7 that controls the discharge operation from the liquid discharge head 1.

The liquid discharge device 100 according to the first embodiment can improve the accuracy of temperature measurement by the detection resistor TK, as compared to an aspect in which the diffusion suppression layer YK is not included.

2. Second Embodiment

The diffusion suppression layer YK in the first embodiment is made of an oxide containing any of metal atoms of zirconium, hafnium, iridium, ruthenium, rhodium, and osmium. On the other hand, a diffusion suppression layer YK in a second embodiment is made of metal atoms of any of iridium, ruthenium, rhodium, and osmium, thereby being different from the diffusion suppression layer in the first embodiment. Hereinafter, the second embodiment will be described below.

Figure 8:
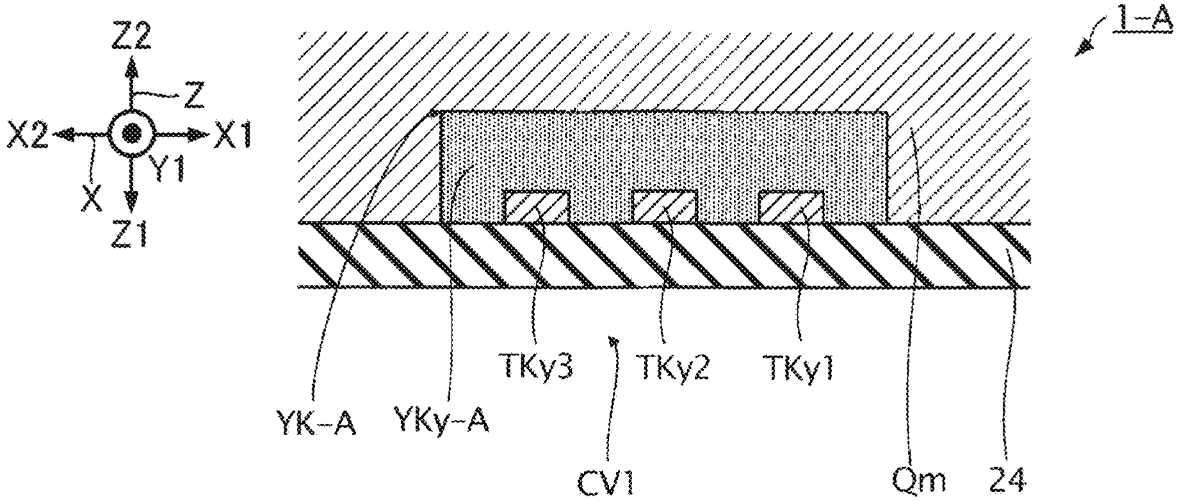
FIG. 8 is a diagram for explaining a liquid discharge head according to a second embodiment.

FIG. 8 is a diagram for explaining a liquid discharge head 1-A according to the second embodiment. FIG. 8 shows an enlarged diagram of the vicinity of an extending part YKy-A of a diffusion suppression layer YK-A in the second embodiment in a section of the liquid discharge head 1-A taken along line VI-VI in FIG. 4. The liquid discharge head 1-A is different from the liquid discharge head 1 in a fact that the diffusion suppression layer YK-A is included instead of the diffusion suppression layer YK. The diffusion suppression layer YK-A is made of metal atoms of any of iridium, ruthenium, rhodium, and osmium.

The diffusion suppression layer YK-A suppresses diffusion of lead atoms into the detection resistor TK. A fact that diffusion of lead atoms into the detection resistor TK is suppressed when the diffusion suppression layer YK-A is made of iridium is obtained through experiments by the inventors. As the thickness of the diffusion suppression layer YK-A increases, the diffusion of lead atoms into the detection resistor TK can be suppressed more. In addition, since it is difficult to transmit the heat of the detection resistor TK to the outside due to the diffusion suppression layer YK-A, the temperature of the detection resistor TK approaches the temperature of the ink in the pressure chamber CV, as compared to the aspect in which the diffusion suppression layer YK is not included. Therefore, the liquid discharge head 1-A according to the second embodiment can improve the accuracy of temperature measurement by the detection resistor TK, as compared to the aspect in which the diffusion suppression layer YK is not included.

3. Third Embodiment

A diffusion suppression layer YK-B in a third embodiment includes a metal layer S1 made of any of metal atoms of iridium, ruthenium, rhodium, and osmium, and an oxide layer S2 made of an oxide containing any of metal atoms of zirconium, hafnium, iridium, ruthenium, rhodium, and osmium, thereby being different from the diffusion suppression layer in the first embodiment. The third embodiment will be described below.

Figure 9:
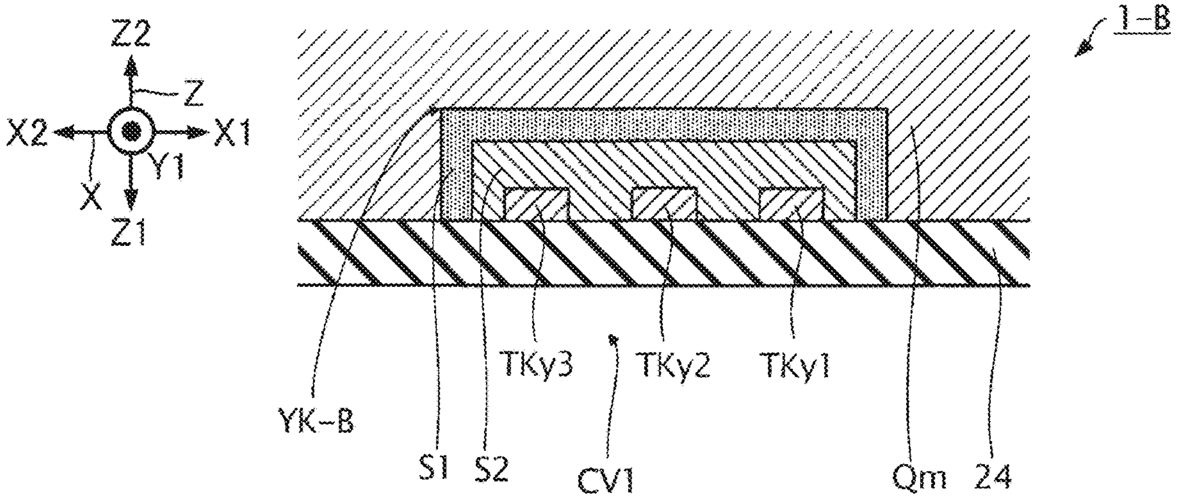
FIG. 9 is a diagram for explaining a liquid discharge head according to a third embodiment.

FIG. 9 is a diagram for explaining a liquid discharge head 1-B according to the third embodiment. FIG. 9 shows an enlarged diagram of the vicinity of an extending part YKy-B of the diffusion suppression layer YK-B in the third embodiment in a section of the liquid discharge head 1-B taken along line VI-VI in FIG. 4. The liquid discharge head 1-B is different from the liquid discharge head 1 in a fact that the diffusion suppression layer YK-B is included instead of the diffusion suppression layer YK.

The diffusion suppression layer YK-B has the metal layer S1 and the oxide layer S2. The metal atoms contained in the metal layer S1 and the metal atoms contained in the oxide layer S2 may be the same type of element or different types of elements. In addition, the diffusion suppression layer YK-B may include layers other than the metal layer S1 and the oxide layer S2. The metal layer S1 is an example of a "first layer". The oxide layer S2 is an example of a "second layer".

As shown in FIG. 9, the detection resistor TK, the oxide layer S2, the metal layer S1, and the piezoelectric body Qm are laminated in this order toward the Z2 direction. In other words, the oxide layer S2 is provided between the detection resistor TK and the metal layer S1. However, the detection resistor TK, the metal layer S1, the oxide layer S2, and the piezoelectric body Qm may be laminated in this order toward the Z2 direction. In the following description, it is assumed that the detection resistor TK, the oxide layer S2, the metal layer S1, and the piezoelectric body Qm are laminated in this order toward the Z2 direction.

The liquid discharge head 1-B according to the third embodiment can improve the accuracy of temperature measurement by the detection resistor TK, as compared to the aspect in which the diffusion suppression layer YK is not included.

In addition, the oxide layer S2 is provided between the detection resistor TK and the metal layer S1.

Since the oxide layer S2 is provided between the detection resistor TK and the metal layer S1, it is difficult to transmit the heat of the detection resistor TK to the metal layer S1, so that the temperature of the detection resistor TK becomes closer to the temperature of the ink in the pressure chamber CV, as compared to an aspect in which the metal layer S1 is provided between the detection resistor TK and the oxide layer S2. Therefore, the liquid discharge head 1-B according to the third embodiment can improve the accuracy of temperature measurement by the detection resistor TK, as compared to the aspect in which the diffusion suppression layer YK is not included.

As described above, including the first, second, and third embodiments, the diffusion suppression layer YK contains any of metal atoms of zirconium, hafnium, iridium, ruthenium, rhodium, and osmium. As understood from the third embodiment, the diffusion suppression layer YK may contain one kind of metal atoms among zirconium, hafnium, iridium, ruthenium, rhodium, and osmium, or may contain two or more kinds of metal atoms.

When the diffusion suppression layer YK includes any of metal atoms of zirconium, hafnium, iridium, ruthenium, rhodium, and osmium, the liquid discharge head 1 of any of the first, second, and third embodiments can improve the accuracy of temperature measurement by the detection resistor TK, as compared to the aspect in which the diffusion suppression layer YK is not included.

4. Fourth Embodiment

A fourth embodiment is different from the first embodiment in a fact that an absorption layer KS is provided between the diffusion suppression layer YK and the piezoelectric body Qm of any of the first to third embodiments. The fourth embodiment will be described below.

Figure 10:
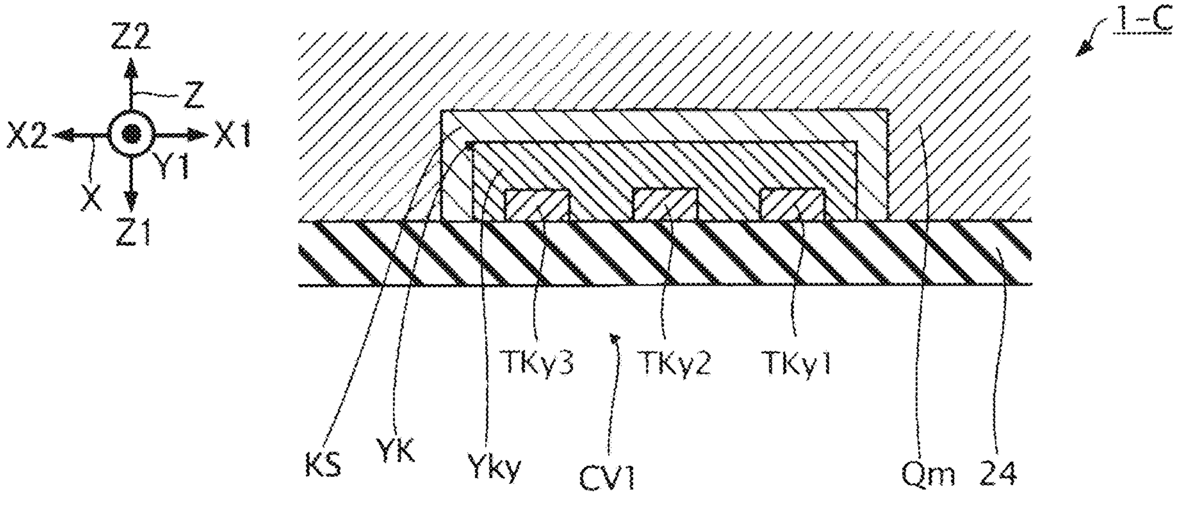
FIG. 10 is a diagram for explaining a liquid discharge head according to a fourth embodiment.

FIG. 10 is a diagram for explaining a liquid discharge head 1-C according to the fourth embodiment. FIG. 10 shows an enlarged diagram of the vicinity of the suppression layer extending part YKy of the diffusion suppression layer YK in the fourth embodiment in a section of the liquid discharge head 1-C taken along line VI-VI in FIG. 4. The liquid discharge head 1-C is different from the liquid discharge head 1 in a fact that the absorption layer KS is included.

As shown in FIG. 10, the absorption layer KS is provided between the diffusion suppression layer YK and the piezoelectric body Qm. The absorption layer KS absorbs lead atoms. The absorption layer KS is made of, for example, titanium. Another layer may be provided between the diffusion suppression layer YK and the absorption layer KS, or another layer may be provided between the absorption layer KS and the piezoelectric body Qm. The absorption layer KS corresponds to a “layer made of titanium”.

As described above, the liquid discharge head 1-C according to the fourth embodiment further includes the absorption layer KS that is provided between the diffusion suppression layer YK and the piezoelectric body Qm and made of titanium. Since the absorption layer KS absorbs lead atoms, it is possible to reduce the number of lead atoms that diffuse from the piezoelectric body Qm to the diffusion suppression layer YK, as compared to an aspect in which the absorption layer KS is not included. Therefore, in the fourth embodiment, it is possible to reduce the number of lead atoms that diffuse to the detection resistor TK, as compared to the aspect in which the absorption layer KS is not included. As described above, the liquid discharge head 1-C according to the fourth embodiment can improve the accuracy of temperature measurement by the detection resistor TK, as compared to the aspect in which the absorption layer KS is not included.

5. Modification Example

Each aspect illustrated above can be modified in various ways. Specific modification modes are illustrated below. Two or more aspects randomly selected from the following illustrations can be combined as appropriate within a mutually consistent range.

5.1. First Modification Example

In each of the above-described embodiments, the common electrode Qb is provided on the surface PL1 of the piezoelectric body Qm and the individual electrode Qc is provided on the surface PL2 of the piezoelectric body Qm, but the common electrode Qb may be provided on the surface PL2 and the individual electrode Qc may be provided on the surface PL1.

Figure 11:
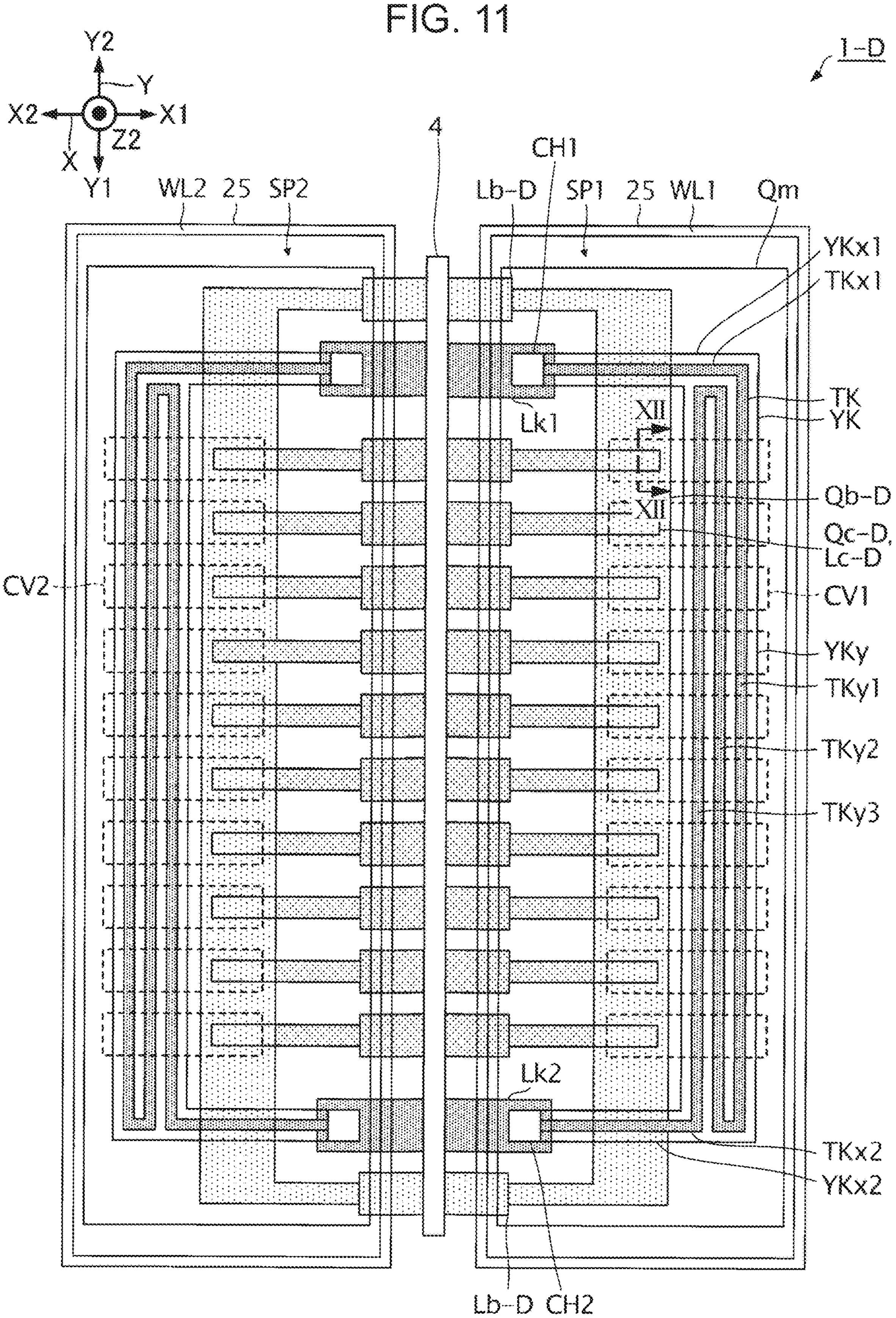
FIG. 11 is a plan view of a liquid discharge head according to a first modification example.
Figure 12:
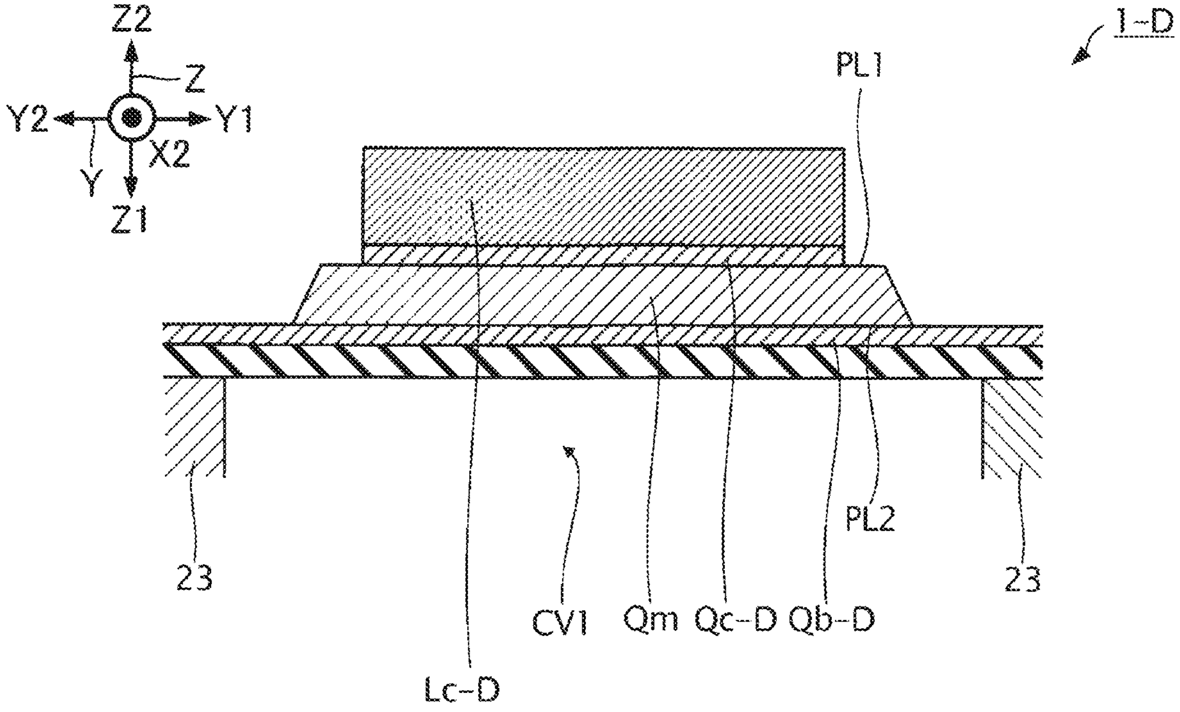
FIG. 12 is a sectional view taken along line XII-XII in FIG. 11.

FIG. 11 is a plan view of a liquid discharge head 1-D when the liquid discharge head 1-D according to a first modification example is viewed from above in the Z1 direction. FIG. 12 is a sectional view taken along line XII-XII in FIG. 11. The liquid discharge head 1-D is different from the liquid discharge head 1 according to the first embodiment in a fact that the liquid discharge head 1-D has a common electrode Qb-D instead of the common electrode Qb, a common wiring Lb-D instead of the common wiring Lb, a plurality of individual electrodes Qc-D instead of the plurality of individual electrodes Qc, and a plurality of individual wirings Lc-D instead of the plurality of individual wirings Lc.

The common wiring Lb-D is a wiring extending in the X axis direction. One end of the common wiring Lb-D is electrically coupled to the wiring provided on the wiring substrate 4, and the other end is coupled to the common electrode Qb-D. As shown in FIG. 12, the common electrode Qb-D is provided on the surface PL2 of the piezoelectric body Qm. In the first modification example, the common electrode Qb-D is a so-called lower electrode. In the first modification example, the common electrode Qb-D is an example of the “second electrode”.

The individual wiring Lc-D is a wiring extending in the X axis direction when the liquid discharge head 1-D is viewed from above in the Z1 direction. One end of the individual wiring Lc-D is electrically coupled to a wiring provided on the wiring substrate 4. The individual electrode Qc-D is provided in a region overlapping the individual wiring Lc-D when the liquid discharge head 1-D is viewed from above in the Z1 direction. The individual electrode Qc-D is coupled to individual wiring Lc-D. As shown in FIG. 12, the individual electrodes Qc-D are provided on the surface PL1 of the piezoelectric body Qm. In the first modification example, the individual electrodes Qc-D is a so-called upper electrode. In addition, in the first modification example, the individual electrode Qc-D is an example of the “first electrode”.

As described above, the liquid discharge head 1-D according to the first modification example further includes the diaphragm 24 that is provided closer to the surface PL2 than the surface PL1 of the piezoelectric body Qm and vibrates when the piezoelectric body Qm is driven, in which the individual electrodes Qc-D are individually provided for the plurality of pressure chambers CV, and the common electrode Lb-D is commonly provided for the plurality of pressure chambers CV.

According to the first embodiment, even in an aspect in which the common electrode Qb-D is the so-called lower electrode and the individual electrode Qc-D is the so-called upper electrode, the accuracy of temperature measurement by the detection resistor TK can be improved. Therefore, according to the first modification example, the degree of freedom in the configuration of the piezoelectric element PZ can be improved.

5.2. Second Modification Example

In each of the above-described embodiments, the diffusion suppression layer YK contacts the diaphragm 24 in the Z1 direction and contacts the detection resistor TK in directions other than the Z1 direction, but the present disclosure is not limited thereto.

Figure 13:
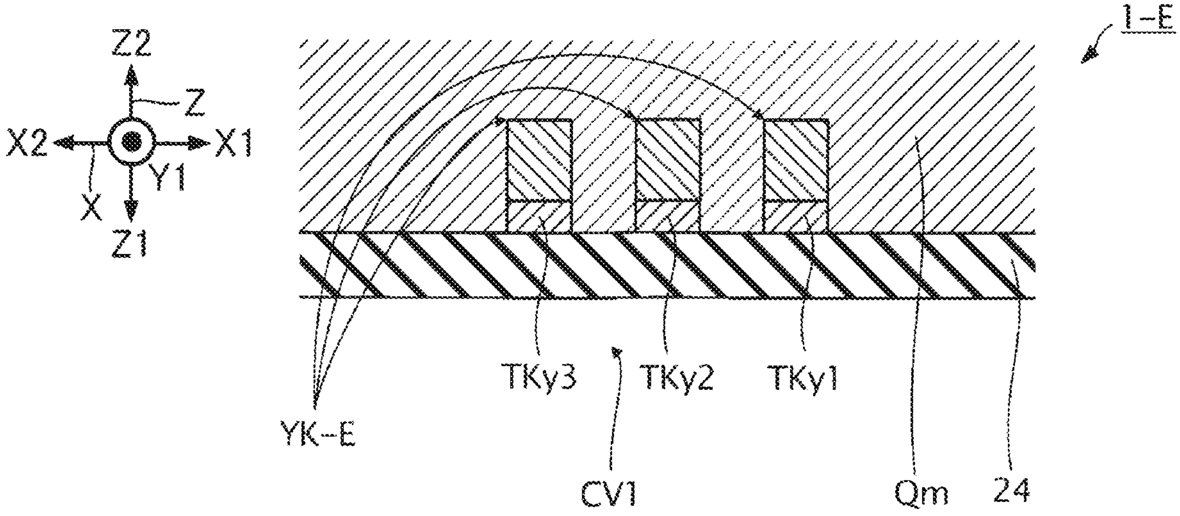
FIG. 13 is a diagram for explaining a liquid discharge head according to a second modification example.

FIG. 13 is a diagram for explaining a liquid discharge head 1-E according to a second modification example. FIG. 13 shows an enlarged view of the vicinity of a diffusion suppression layer YK-E in the second modification example in a section of the liquid discharge head 1-E taken along line VI-VI in FIG. 4. The liquid discharge head 1-E is different from the liquid discharge head 1 according to the first embodiment in a fact that the diffusion suppression layer YK-E is included instead of the diffusion suppression layer YK.

When the liquid discharge head 1 is viewed from above in the Z1 direction, the outer shape of the diffusion suppression layer YK-E substantially matches the outer shape of the detection resistor TK. In the second modification example, the detection resistor TK contacts the diaphragm 24 in the Z1 direction, contacts the diffusion suppression layer YK-E in the Z2 direction, and contacts the piezoelectric body Qm in the X axis direction and the Y axis direction.

According to the second modification example, the diffusion suppression layer YK-E suppresses the diffusion of lead atoms that are moved in the Z1 direction from the piezoelectric body Qm into the detection resistor TK. Therefore, the liquid discharge head 1-E according to the second modification example can improve the accuracy of temperature measurement by the detection resistor TK, as compared to the aspect in which the diffusion suppression layer YK-E is not included. However, in the second modification example, the diffusion suppression layer YK-E cannot suppress the lead atoms, which are moved from the piezoelectric body Qm in the direction perpendicular to the Z axis direction, for example, the X axis direction or the Y axis direction, from diffusing into the detection resistor TK, so that the liquid discharge head 1 according to the first embodiment can improve the accuracy of temperature measurement by the detection resistor TK, as compared to the liquid discharge head 1-E according to the second modification example.

5.3. Third Modification Example

In each of the embodiments described above, the detection resistor TK is provided closer to the surface PL2 than the surface PL1 of the piezoelectric body Qm, but may be provided closer to the surface PL1 than the surface PL2 of the piezoelectric body Qm.

Figure 14:
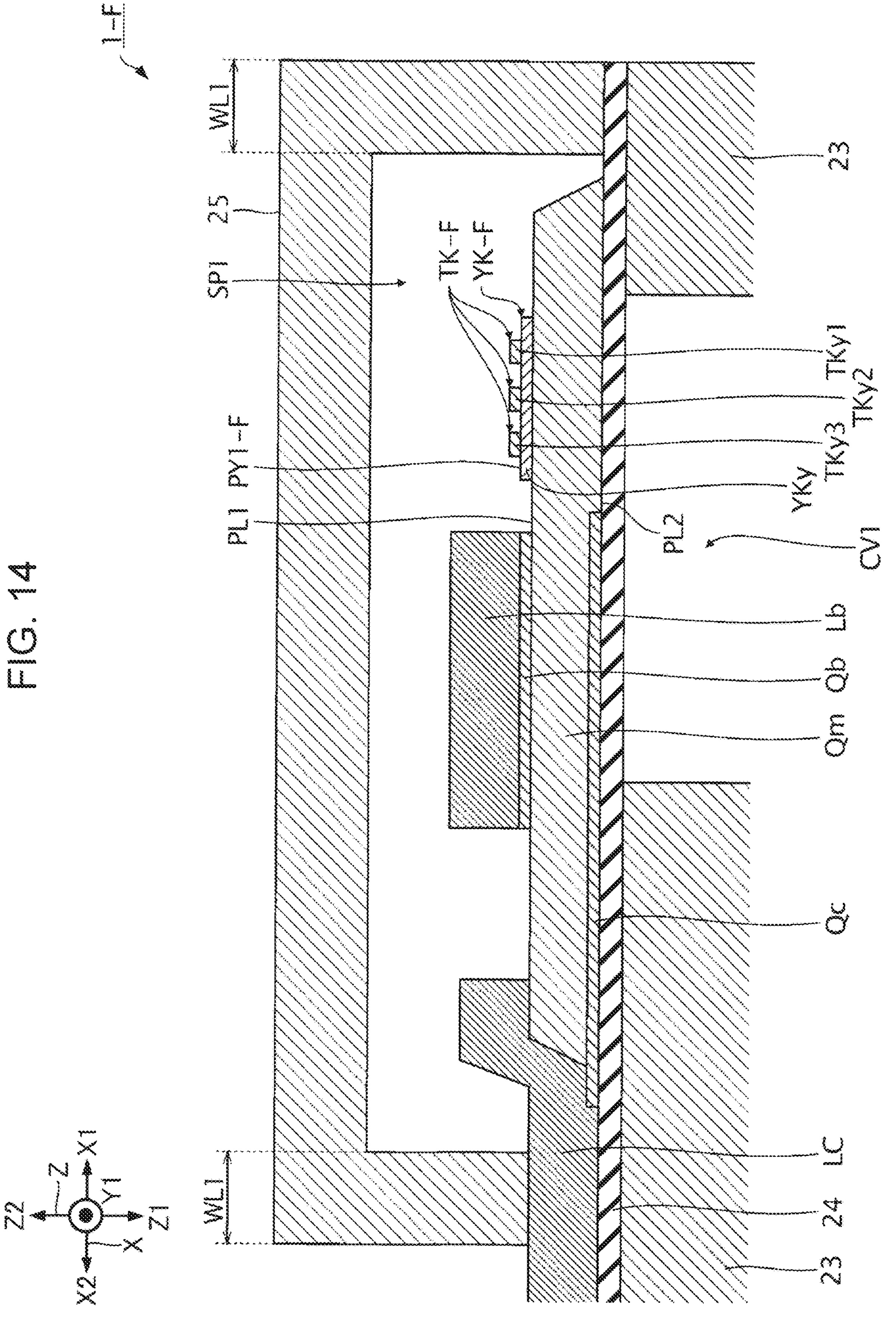
FIG. 14 is a diagram for explaining a liquid discharge head according to a third modification example.

FIG. 14 is a diagram for explaining a liquid discharge head 1-F according to a third modification example. FIG. 14 shows a section of the liquid discharge head 1-F taken along line VI-VI in FIG. 4. The liquid discharge head 1-F is different from the liquid discharge head 1 according to the first embodiment in a fact that the liquid discharge head 1-F has a detection resistor TK-F instead of the detection resistor TK, and a diffusion suppression layer YK-F instead of the diffusion suppression layer YK.

As shown in FIG. 14, the diffusion suppression layer YK-F is provided on the surface PL1 of the piezoelectric body Qm. The detection resistor TK-F is provided on the surface PY1-F of the diffusion suppression layer YK-F, which faces the Z2 direction. In other words, the detection resistor TK-F is formed on the surface PL1 through the diffusion suppression layer YK-F. The detection resistor TK-F is provided closer to the surface PL1 than the surface PL2. In the third modification example, a case is assumed in which the detection resistor TK-F is formed of the same material as the common electrode Qb.

As described above, in the third modification example, the detection resistor TK-F is formed of the same material as the common electrode Qb.

The liquid discharge head 1-F according to the third modification example can suppress an increase in the manufacturing cost of the liquid discharge head 1-F due to the provision of the detection resistor TK-F, as compared to an aspect in which the detection resistor TK-F and the common electrode Qb are formed of different materials.

In addition, in the third modification example, the detection resistor TK-F is provided closer to the surface PL1 of the piezoelectric body Qm than the surface PL2.

That is, in the liquid discharge head 1-F according to the third modification example, the detection resistor TK-F and the common electrode Qb are provided in substantially the same layer, so that the detection resistor TK-F and the common electrode Qb can be simultaneously patterned. For this reason, according to the liquid discharge head 1-F according to the third modification example, it is possible to suppress the increase in the manufacturing cost of the liquid discharge head 1-F due to the provision of the detection resistor TK-F, as compared to an aspect in which the detection resistor TK-F and the common electrode Qb are provided in different layers.

5.4. Fourth Modification Example

In each of the above-described embodiments, description is performed such that the diffusion suppression layer YK is not provided between the piezoelectric body Qm and the individual electrode Qc, but the diffusion suppression layer YK may be provided between the piezoelectric body Qm and the individual electrode Qc.

Figure 15:
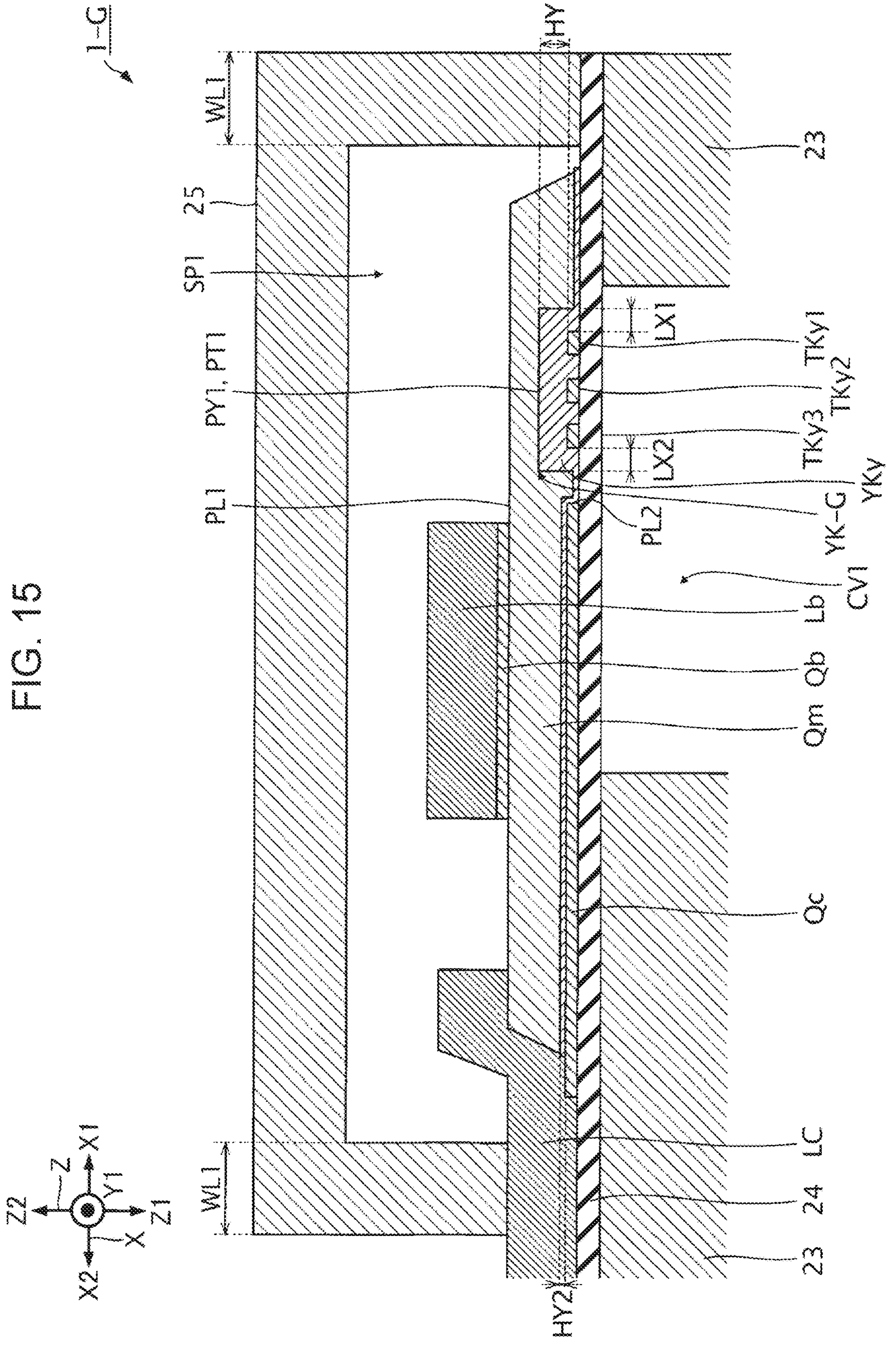
FIG. 15 is a diagram for explaining a liquid discharge head according to a fourth modification example.

FIG. 15 is a diagram for explaining a liquid discharge head 1-G according to a fourth modification example. FIG. 15 shows a section of the liquid discharge head 1-G taken along line VI-VI in FIG. 4. The liquid discharge head 1-G is different from the liquid discharge head 1 according to the first embodiment in a fact that the liquid discharge head 1-G has a diffusion suppression layer YK-G instead of the diffusion suppression layer YK. In addition, in the fourth modification example, it is assumed that the piezoelectric body Qm contains metal atoms capable of forming the diffusion suppression layer YK, specifically, zirconium atoms.

The diffusion suppression layer YK-G is provided not only between the detection resistor TK and the piezoelectric body Qm but also between the individual electrode Qc and the piezoelectric body Qm. Furthermore, in FIG. 15, when the liquid discharge head 1-G is viewed from above in the Z1 direction between the surface PL2 of the piezoelectric body Qm and the diaphragm 24, the diffusion suppression layer YK-G is provided in a region in which the individual electrode Qc is not included. For example, when the piezoelectric body Qm is formed by baking the piezoelectric body Qm at a high temperature, a portion of the diffusion suppression layer YK-G between the piezoelectric body Qm and the individual electrode Qc is formed in such a way that the zirconium atoms contained in the piezoelectric body Qm are deposited and zirconium oxide is formed.

As shown in FIG. 15, a thickness HY of the portion of the diffusion suppression layer YK-G between the detection resistor TK and the piezoelectric body Qm is more than a thickness HY2 of the portion of the diffusion suppression layer YK-G between the piezoelectric body Qm and the individual electrode Qc.

According to the fourth modification example, the diffusion suppression layer YK-G is generated by baking the piezoelectric body Qm at a high temperature, so that the liquid discharge head 1 can be manufactured more easily than the liquid discharge head 1 according to the first embodiment. In addition, since the thickness HY is more than the thickness HY2, it is possible to suppress a change in electrification characteristics of the piezoelectric element PZ reaching the common electrode Qb from the individual electrode Qc through the piezoelectric body Qm, as compared to an aspect in which the thickness HY2 is more than the thickness HY. Therefore, according to the liquid discharge head 1-G according to the fourth modification example, it is possible to reduce the possibility that discharge defects occur, as compared to an aspect in which the thickness HY2 is more than the thickness HY.

5.5. Fifth Modification Example

In each of the above-described aspects, the detection resistor TK corresponding to the pressure chamber CV2, that is, the detection resistor TK provided in the X2 direction from the wiring substrate 4 is separately provided from the detection resistor TK corresponding to the pressure chamber CV1, that is, the detection resistor TK provided in the X1 direction from the wiring substrate 4, but the present disclosure is not limited thereto. For example, the detection resistor TK corresponding to the pressure chamber CV1 and the detection resistor TK corresponding to the pressure chamber CV2 may be integrally provided.

Figure 16:
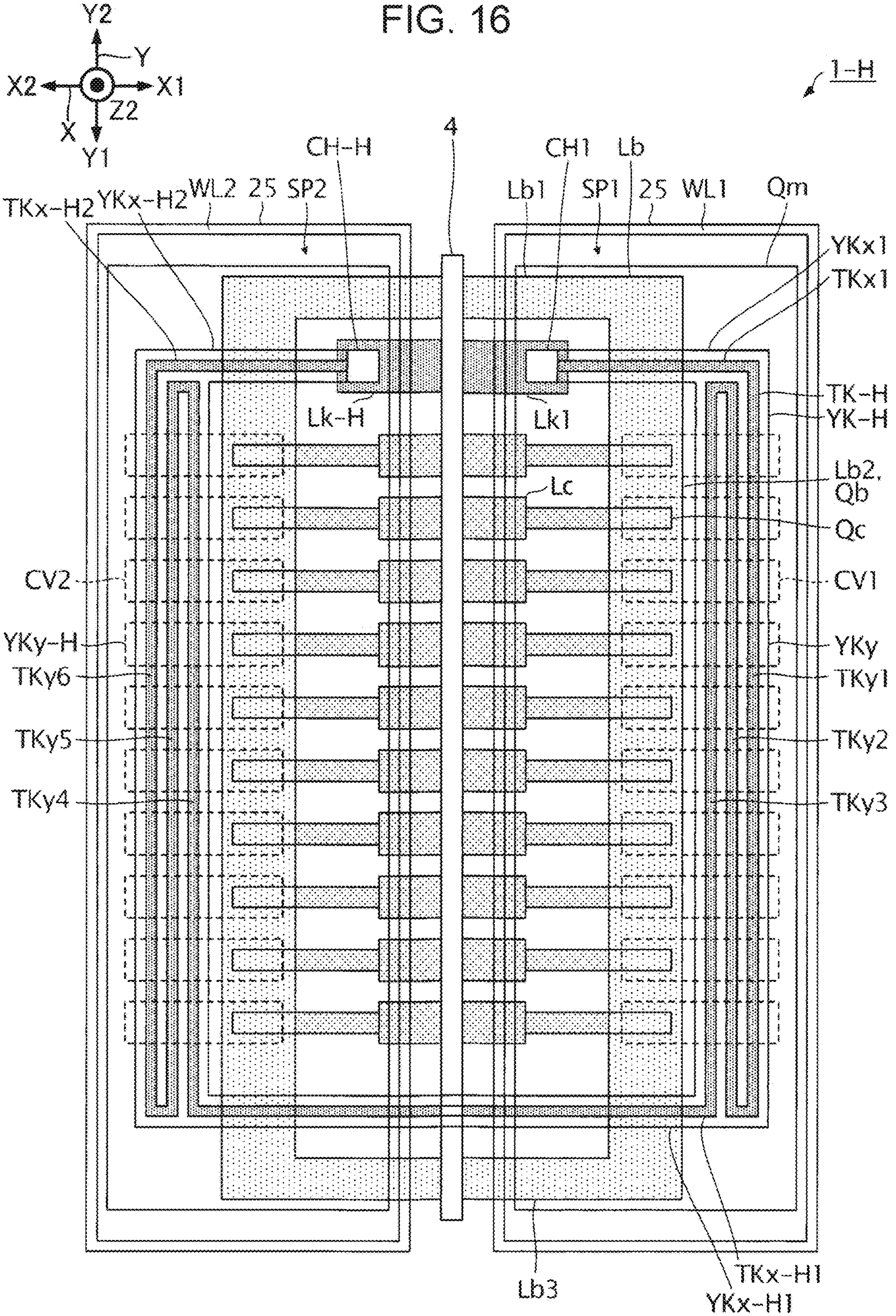
FIG. 16 is a plan view of a liquid discharge head according to a fifth modification example.

FIG. 16 is a plan view of a liquid discharge head 1-H according to a fifth modification example when the liquid discharge head 1-H is viewed from above in the Z1 direction.

As shown in FIG. 16, the liquid discharge head 1-H is different from the liquid discharge head 1 according to the first embodiment in a fact that the liquid discharge head 1-H includes one detection resistor TK-H instead of the two of the detection resistor TK corresponding to the pressure chamber CV1 and the detection resistor TK corresponding to the pressure chamber CV2, and one diffusion suppression layer YK-H instead of two diffusion suppression layers YK corresponding to the two detection resistors TK.

The detection resistor TK-H is different from the detection resistor TK in a fact that the detection resistor TK-H has a resistor extending part TKx-H1 provided to intersect the wiring substrate 4, a resistor extending part TKy4, a resistor extending part TKy5, a resistor extending part TKy6 that are positioned in the X2 direction from the wiring substrate 4, and a resistor extending part TKx-H2, instead of the resistor extending part TKx2.

The resistor extending part TKx-H1 is provided to intersect the wiring substrate 4 and extend in the X axis direction when the liquid discharge head 1-H is viewed in the Z1 direction. One end of the resistor extending part TKx-H1 is coupled to a resistor extending part TKy3, and the other end is coupled to the resistor extending part TKy4.

The resistor extending part TKy4 is provided to be line symmetrical with the resistor extending part TKy3 with the wiring substrate 4 as the axis of symmetry. One end of the resistor extending part TKy4 is coupled to the resistor extending part TKx-H1, and the other end is coupled to the resistor extending part TKy5.

The resistor extending part TKy5 is provided to be line symmetrical with a resistor extending part TKy2 with the wiring substrate 4 as the axis of symmetry. One end of the resistor extending part TKy5 is coupled to the resistor extending part TKy4, and the other end is coupled to the resistor extending part TKy6.

The resistor extending part TKy6 is provided to be line symmetrical with a resistor extending part TKy1 with the wiring substrate 4 as the axis of symmetry. One end of the resistor extending part TKy6 is coupled to the resistor extending part TKy5, and the other end is coupled to a resistor extending part TKx-H2.

The resistor extending part TKx-H2 is provided to be line symmetrical with a resistor extending part TKx1 with the wiring substrate 4 as the axis of symmetry. One end of the resistor extending part TKx-H2 is coupled to the resistor extending part TKy6, and the other end is coupled to a contact hole CH-H of a detection wiring LK-H.

Here, the detection wiring LK-H is provided to be line symmetrical with a detection wiring LK1 with the wiring substrate 4 as the axis of symmetry, and is electrically coupled to the wiring on the wiring substrate 4 set to the ground potential. In addition, the contact hole CH-H is provided to be line symmetrical with the contact hole CH1 with the wiring substrate 4 as the axis of symmetry.

In the present modification example, the current I0 supplied to the detection wiring LK1 flows from the detection wiring LK1 to the wiring on the wiring substrate 4, to which the detection wiring LK-H is electrically coupled, via the resistor extending part TKx1, the resistor extending part TKy1, the resistor extending part TKy2, the resistor extending part TKy3, the resistor extending part TKx-H1, the resistor extending part TKy4, the resistor extending part TKy5, the resistor extending part TKy6, the resistor extending part TKx-H2, and the detection wiring LK-H. Further, the voltage detection circuit 82 according to the present modification example detects the voltage VK-H applied to both ends of the detection resistor TK-H.

In addition, the temperature specifying section 71 according to the present modification example specifies the temperature of the ink in the pressure chamber CV based on the voltage VK-H detected by the voltage detection circuit 82.

The diffusion suppression layer YK-H is different from the diffusion suppression layer YK in a fact that the diffusion suppression layer YK-H includes a suppression layer extending part YKx-H1 provided to intersect the wiring substrate 4, a suppression layer extending part YKy-H positioned in the X2 direction from the wiring substrate 4, and a suppression layer extending part YKx-H2, instead of the suppression layer extending part YKx2.

The suppression layer extending part YKx-H1 is provided to intersect the wiring substrate 4 and extend in the X axis direction when the liquid discharge head 1-H is viewed in the Z1 direction. One end of the suppression layer extending part YKx-H1 is coupled to a suppression layer extending part YKy, and the other end is coupled to a suppression layer extending part YKy-H. The suppression layer extending part YKx-H1 is provided to cover a resistor extending part TKx-H1.

The suppression layer extending part YKy-H is provided to be line symmetrical with the suppression layer extending part YKy with the wiring substrate 4 as the axis of symmetry. One end of the suppression layer extending part YKy-H is coupled to the suppression layer extending part YKx-H1, and the other end is coupled to the suppression layer extending part YKx-H2. The suppression layer extending part YKy-H is provided to cover the resistor extending part TKy4, the resistor extending part TKy5, and the resistor extending part TKy6. The suppression layer extending part YKx-H2 is provided to be line symmetrical with a suppression layer extending part YKx1 with the wiring substrate 4 as the axis of symmetry. One end of the suppression layer extending part YKx-H2 is coupled to the suppression layer extending part YKy-H and coupled to the contact hole CH-H.

5.6. Sixth Modification Example

In each of the above-described aspects, the serial-type liquid discharge device 100 in which the storage case 921 is reciprocated in the X axis direction is illustrated, but the present disclosure is not limited to the aspect. The liquid discharge device may be a line-type liquid discharge device in which the plurality of nozzles N are distributed over the entire width of the medium PP.

5.7. Seventh Modification Example

The liquid discharge device of each of the above-described aspects can be employed in various types of equipment, such as a facsimile device and a copy machine, in addition to equipment dedicated to printing. However, the application of the liquid discharge device of the present disclosure is not limited to printing. For example, a liquid discharge device that discharges a colorant solution is used as a manufacturing device for forming a color filter of a liquid crystal display device. In addition, a liquid discharge device that discharges a solution of a conductive material is used as a manufacturing device for forming wiring and electrodes of a wiring substrate.

What is claimed is:

1. A liquid discharge head comprising:
a pressure chamber substrate that is provided with a plurality of pressure chambers;
a piezoelectric body that is driven to apply pressure to a liquid in the plurality of pressure chambers, and contains lead atoms;
a first electrode that is provided on a first surface of two surfaces of the piezoelectric body;
a second electrode that is provided on a second surface opposite to the first surface of the two surfaces of the piezoelectric body;
a drive wiring that is electrically coupled to the first electrode and the second electrode, and applies a voltage for driving the piezoelectric body;
a resistor that is formed of the same material as any of the first electrode, the second electrode, and the drive wiring to measure a temperature of the liquid in the plurality of pressure chambers; and
a diffusion suppression layer that is provided between the resistor and the piezoelectric body to suppress diffusion of lead atoms contained in the piezoelectric body into the resistor,
wherein the diffusion suppression layer contains any of metal atoms of zirconium, hafnium, iridium, ruthenium, rhodium, and osmium.

2. The liquid discharge head according to claim 1, wherein the diffusion suppression layer is made of an oxide containing the metal atoms.

3. The liquid discharge head according to claim 1, wherein
the diffusion suppression layer includes a first layer made of any of metal atoms of iridium, ruthenium, rhodium, and osmium, and a second layer made of an oxide containing any of metal atoms of zirconium, hafnium, iridium, ruthenium, rhodium, and osmium.

4. The liquid discharge head according to claim 3, wherein
the second layer is provided between the resistor and the first layer.

5. The liquid discharge head according to claim 1, further comprising:
a layer made of titanium provided between the diffusion suppression layer and the piezoelectric body.

6. The liquid discharge head according to claim 1, further comprising:
a diaphragm that is provided closer to the second surface than the first surface of the piezoelectric body and vibrates when the piezoelectric body is driven, wherein
the first electrode is commonly provided for the plurality of pressure chambers, and
the second electrode is individually provided for the plurality of pressure chambers.

7. The liquid discharge head according to claim 1, further comprising:
a diaphragm that is provided closer to the second surface than the first surface of the piezoelectric body and vibrates when the piezoelectric body is driven, wherein
the first electrode is individually provided for the plurality of pressure chambers, and
the second electrode is commonly provided for the plurality of pressure chambers.

8. A liquid discharge head comprising:
a pressure chamber substrate that is provided with a plurality of pressure chambers;
a piezoelectric body that is driven to apply pressure to a liquid in the plurality of pressure chambers, and contains lead atoms;
a first electrode that is provided on a first surface of two surfaces of the piezoelectric body;
a second electrode that is provided on a second surface opposite to the first surface of the two surfaces of the piezoelectric body;
a drive wiring that is electrically coupled to the first electrode and the second electrode, and applies a voltage for driving the piezoelectric body;
a resistor that is formed of the same material as any of the first electrode, the second electrode, and the drive wiring to measure a temperature of the liquid in the plurality of pressure chambers;
a diffusion suppression layer that is provided between the resistor and the piezoelectric body to suppress diffusion of lead atoms contained in the piezoelectric body into the resistor; and
a diaphragm that is provided closer to the second surface than the first surface of the piezoelectric body and vibrates when the piezoelectric body is driven, wherein
the first electrode is commonly provided for the plurality of pressure chambers,
the second electrode is individually provided for the plurality of pressure chambers, and
the resistor is formed of the same material as the second electrode.

9. The liquid discharge head according to claim 8, wherein the resistor is provided closer to the second surface than the first surface of the piezoelectric body.

10. The liquid discharge head according to claim 8, wherein the diaphragm includes an insulating layer that is made of zirconium oxide, and the diffusion suppression layer contains zirconium oxide.

11. The liquid discharge head according to claim 6, wherein the resistor is formed of the same material as the first electrode.

12. The liquid discharge head according to claim 11, wherein the resistor is provided closer to the first surface than the second surface of the piezoelectric body.

13. The liquid discharge head according to claim 1, wherein the resistor contains platinum.

14. A liquid discharge head comprising:

a pressure chamber substrate that is provided with a plurality of pressure chambers;

a piezoelectric body that is driven to apply pressure to a liquid in the plurality of pressure chambers, and contains lead atoms;

a first electrode that is provided on a first surface of two surfaces of the piezoelectric body;

a second electrode that is provided on a second surface opposite to the first surface of the two surfaces of the piezoelectric body;

a drive wiring that is electrically coupled to the first electrode and the second electrode, and applies a voltage for driving the piezoelectric body;

a resistor that is formed of the same material as any of the first electrode, the second electrode, and the drive wiring to measure a temperature of the liquid in the plurality of pressure chambers; and a diffusion suppression layer that is provided between the resistor and the piezoelectric body to suppress diffusion of lead atoms contained in the piezoelectric body into the resistor, wherein a thickness of the resistor is less than a thickness of the diffusion suppression layer.

15. The liquid discharge head according to claim 1, wherein the diffusion suppression layer is not provided between the piezoelectric body and the second electrode.

16. The liquid discharge head according to claim 1, wherein the diffusion suppression layer is also provided between the piezoelectric body and the second electrode, and a thickness of a portion of the diffusion suppression layer between the resistor and the piezoelectric body is more than a thickness of a portion of the diffusion suppression layer between the piezoelectric body and the second electrode.

17. A liquid discharge device comprising:

the liquid discharge head according to claim 1; and a control section that controls a discharge operation from the liquid discharge head.

* * * * *